(12) United States Patent
Weinstein et al.

(10) Patent No.: US 7,489,105 B2
(45) Date of Patent: Feb. 10, 2009

(54) PORTABLE POWER SUPPLY

(75) Inventors: Nir Weinstein, Bat-Hefer (IL); Benny Gaber, Haifa (IL)

(73) Assignee: Eveready Battery Company, Inc., St. Louis, MO (US)

( * ) Notice: Subject to any disclaimer, the term of this patent is extended or adjusted under 35 U.S.C. 154(b) by 390 days.

(21) Appl. No.: 11/385,209

(22) Filed: Mar. 21, 2006

(65) Prior Publication Data

US 2006/0208695 A1    Sep. 21, 2006

Related U.S. Application Data

(60) Provisional application No. 60/663,865, filed on Mar. 21, 2005.

(51) Int. Cl.
*H01M 10/44* (2006.01)
*H01M 10/46* (2006.01)

(52) U.S. Cl. ..................................................... 320/114
(58) Field of Classification Search ................. 320/107, 320/109, 110, 114, 115, 141
See application file for complete search history.

(56) References Cited

U.S. PATENT DOCUMENTS

| | | |
|---|---|---|
| 5,136,229 A | 8/1992 | Galvin |
| 5,635,814 A | 6/1997 | Afzal et al. |
| 5,739,596 A | 4/1998 | Takizawa et al. |
| 5,780,992 A | 7/1998 | Beard |
| 5,808,442 A | 9/1998 | Kaite et al. |
| 5,814,969 A | 9/1998 | Banyas |
| 5,831,350 A | 11/1998 | McConkey et al. |
| 5,903,131 A | 5/1999 | Sekine et al. |
| 5,963,010 A | 10/1999 | Hayashi et al. |
| 6,021,332 A | 2/2000 | Alberth et al. |
| 6,097,175 A | 8/2000 | Yoon |
| 6,127,801 A | 10/2000 | Manor |
| 6,127,809 A | 10/2000 | Kates et al. |
| 6,184,654 B1 | 2/2001 | Bachner, III et al. |
| 6,249,105 B1 | 6/2001 | Andrews et al. |
| 6,314,308 B1 | 11/2001 | Sheynblat et al. |
| 6,437,536 B2 | 8/2002 | Higuchi |
| 6,479,963 B1 | 11/2002 | Manor et al. |
| 6,509,717 B2 | 1/2003 | Lee |

(Continued)

FOREIGN PATENT DOCUMENTS

EP    0718951 A    6/1996

(Continued)

OTHER PUBLICATIONS

Patent Cooperation Treaty (PCT), International Search Report and Written Opinion for Application PCT/US2007/004575, filed Feb. 20, 2007, mailed Dec. 18, 2007, European Patent Office, Netherlands.

(Continued)

*Primary Examiner*—Edward Tso
(74) *Attorney, Agent, or Firm*—Gregory J. Adams

(57) ABSTRACT

A portable electrochemical power supply for handheld electronic devices, such as cellular telephones, is disclosed. The power supply includes a housing with an electrical connector, a circuit board, and a removable electrochemical cell disposed therein. The circuit board carries power supply circuitry which receives electrical energy from the electrochemical cell and provides a power supply output for powering an external device.

49 Claims, 12 Drawing Sheets

U.S. PATENT DOCUMENTS

| | | | |
|---|---|---|---|
| 6,583,601 | B2 | 6/2003 | Simoes et al. |
| 6,597,151 | B1 | 7/2003 | Price et al. |
| 6,774,604 | B2 | 8/2004 | Matsuda et al. |
| 6,821,670 | B2 | 11/2004 | Hsuch |
| 6,864,664 | B2 | 3/2005 | Clift |
| 6,864,666 | B2 | 3/2005 | Breen et al. |
| 7,057,372 | B2 | 6/2006 | Chen et al. |
| 2001/0003205 | A1 | 6/2001 | Gilbert |
| 2001/0020838 | A1 | 9/2001 | Malackowski |
| 2002/0039016 | A1 | 4/2002 | You Sun, II et al. |
| 2002/0093311 | A1 | 7/2002 | Stryker et al. |
| 2002/0101218 | A1 | 8/2002 | Koenck et al. |
| 2003/0094924 | A1 | 5/2003 | Oh |
| 2003/0205988 | A1 | 11/2003 | Vaisnys et al. |
| 2003/0220145 | A1 | 11/2003 | Erickson et al. |
| 2004/0021446 | A1 | 2/2004 | Bang et al. |
| 2004/0164715 | A1 | 8/2004 | Nawa et al. |
| 2004/0217739 | A1 | 11/2004 | Cummings |
| 2005/0099156 | A1 | 5/2005 | Brenner |
| 2005/0127871 | A1 | 6/2005 | Orikasa |
| 2005/0162132 | A1 | 7/2005 | Nagasawa |
| 2005/0174094 | A1 | 8/2005 | Purdy et al. |
| 2005/0189909 | A1 | 9/2005 | Guthrie et al. |
| 2005/0280398 | A1 | 12/2005 | Lee et al. |
| 2006/0119324 | A1 | 6/2006 | Kim |
| 2006/0145661 | A1 | 7/2006 | Patino et al. |
| 2006/0208695 | A1 | 9/2006 | Weinstein et al. |
| 2007/0063669 | A1 | 3/2007 | Keating |

FOREIGN PATENT DOCUMENTS

| | | | |
|---|---|---|---|
| EP | 1113562 | A | 7/2001 |
| EP | 1185104 | A | 3/2002 |
| EP | 1523081 | A | 4/2005 |
| EP | 1569315 | A | 8/2005 |
| EP | 1603008 | A | 12/2005 |
| EP | 1715241 | A | 10/2006 |
| WO | 9407293 | A | 3/1994 |
| WO | 9749159 | A | 12/1997 |
| WO | 0007275 | A | 2/2000 |
| WO | 0122696 | A | 3/2001 |
| WO | 0217460 | A | 2/2002 |

OTHER PUBLICATIONS

Techtium, News & Events Techtium Announces Launch of Mobile-UPS, an Analog Battery Management IC for Portable Devices, Sep. 4, 2001, 2 pages, http://www.techlium.com/news-september42001.htm.

Techtium. News & Events On-board hybrid battery management chip makes built-in mobile charging and mobile UPS a reality, Feb. 28, 2002, 1 page, http://www,techtium.com/news-Feb. 28-2002.htm.

Sullivan et al., The Heat Stake Advantage, Assembly update Plastics Assembly, Jan.-Feb. 2003, pp. 12-13, Specialized Assembly Systems LLC.

CHARGE2GO, Product Specs, 2004, 3 pages, http://www.chargetogo.com/specs.html.

Techtium Hybrid Battery Management Technology, TCM-EXT06R8 External Charger Circuit from Single-Cell Primary Battery to GSM Cellular Phone datasheet, Jan. 2005, pp. 1-8, www.Techtium.com.

Martinez, et al., Intersil Smart Battery Primer Application Note, Jul. 11, 2005, pp. 1-10, AN126.0, www.intersil.com.

Cellboost, Frequently Asked Questions, downloaded Feb. 8, 2006, 2 pages, http://www.cellboost.com/us/faq.htm.

Cellboost, How to use Cellboost, downloaded Feb. 8, 2006, 3 pages, http://www.cellboost.com/us/how_cellboost.htm.

Cellboost, How to use iRecharge, downloaded Feb. 8, 2006, 2 pages, http://www.cellboost.com/us/how_irecharge.htm.

Cellboost, Products for Game Players, downloaded Feb. 8, 2006, 2 pages, http://www.cellboost.com/us/game_compatibility_psp1.htm.

Techtium, Products, downloaded Feb. 8, 2006, 4 pages, http://www.techtium.com/products.htm.

Techtium Hybrid Battery management Technology, TEC103 Step-Up Converter and Charger Controller from Primary Battery to NiCad, NiMH or Li-Ion, Secondary Batteries datasheet, downloaded Feb. 9, 2006, pp. 1-28, http://www.techtium.com/PDF/TEC103.pdf.

Office Action mailed on Jun. 12, 2008 in U.S. Appl. No. 11/360,789.

Patent Cooperation Treaty (PCT), International Search Report and Written Opinion for Application PCT/US2007/004627 filed Feb. 20, 2007, mailed Oct. 19, 2007, 12 pgs., European Patent Office, Netherlands.

3COM Corporation, Handbook for Palm VII Organizer, 1998, 302 pages.

Research in Motion, RIM 950 & 957 Wireless Handhelds Installation and Getting Started Guide, 2001, 97 pages.

Shawn Barnett, Palm VII, Pen Computing Magazine, 1995-1999, 3 pages, http://www.pencomputing.com/palm/Reviews/palm7_main.html.

Motorola, Talkabout Personal Interactive Communicator Model T900 User's Guide, 2000, title page, table of contents, pp. 1-53, notes and copyright page.

Eveready Battery Company, Inc., Eveready Carbon Zinc (Zn/MnO2) Application Manual, Nov. 6, 2001, pp. 1-13.

Eveready Battery Company, Inc., Eveready Cylindrical Alkaline Application Manual, Nov. 6, 2001, pp. 1-11.

Telephony Design, Blackberry (Research in Motion), Apr. 2, 2002, 3 pages, http://ptd.weblogger.com/stories/storyReader$136.

Eveready Battery Company, Inc., Energizer No. 1215 Engineering Datasheet, Oct. 2002, 2 pages, www.energizer.com.

Energizer, Application Manual Lithium Iron Disulfide (Li/FeS2), 2005, pp. 1-7, http://data.energizer.com.

Energizer Holdings, Inc., Energizer NH15-2500 Product Datasheet, Nov. 2005, 1 page, www.energizer.com.

Energizer Holdings, Inc., Energizer E91 Product Datasheet, Aug. 2006, pp. 1-2, www.energizer.com.

Energizer Holdings, Inc., Energizer L91 Product Datasheet, Sep. 2006, pp. 1-2, www.energizer.com.

Patent Cooperation Treaty (PCT), International Search Report and Written Opinion for Application PCT/US2008/000952, filed Jan. 24, 2008, mailed Jun. 20, 2008, European Patent Office, Netherlands.

Patent Cooperation Treaty (PCT), International Search Report and Written Opinion for Application No. PCT/US2008/052002, filed Jan. 25, 2008, mailed Jul. 2, 2008, European Patent Office, Netherlands.

PORTABLE POWER SUPPLY

This application claims the benefit of U.S. Provisional Application No. 60/663,865, filed Mar. 21, 2005.

BACKGROUND OF THE INVENTION

This invention generally relates to a portable direct current power supply for a handheld electronic device. More particularly, this invention pertains to a direct current power supply for devices such as cellular phones.

The proliferation of portable battery powered devices, such as cellular telephones, has increased dramatically in the last several years and this trend is expected to continue. The phones typically use a rechargeable battery that is built into the phone to provide the needed power. The length of time that the battery powers the phone is dependent primarily upon the size of the battery and the number of energy consuming features built into the phone. In response to consumer demand, cell phone manufacturers incorporate into the phones features such as the ability to send and receive digital pictures and/or text messages. Unfortunately, the inclusion of these features usually places additional demands on the rechargeable batteries that power the cell phones. The net result is that the cell phones' run times become shorter and shorter due to the increased power demands. At the same time that the electrical demand placed on the battery is increasing, the size and weight of cell phones is decreasing in order to reduce the size of the phones. As the size of the cell phone is reduced, the size of the battery compartment built into the cell phone is also reduced. The existence of these two trends (i.e. increased electrical demand and reduced battery size) has caused many cell phone users to experience a failed telephone call or data transmission due to the depletion of their phone's battery at an inopportune moment. An additional trend that complicates resolving this problem is that most cell phones require a battery that has specific size and shape characteristics. In order to encourage consumers to purchase replacement batteries from the cell phone manufacturer, the cell phones are made with batteries that have unique shapes, locking mechanisms, voltage requirements, etc. Furthermore, the recharging port built into the cell phones limit the type of charger that can be connected to the cell phone. Collectively, these factors limit the consumer's ability to rapidly replace the depleted battery with another power supply.

Numerous attempts have been made to develop a suitable portable power supply for cellular telephones. For example, U.S. Pat. No. 6,127,801 discloses a power supply that includes a battery pack and a base unit which has bidirectional circuitry. The battery pack is made to snap into the base unit which is designed to be clipped onto the cellular telephone. Unfortunately, the battery pack and base unit tend to increase the size and weight of the cell phone, which is contrary to the consumer's desire, while also causing additional proliferation in the number of components the consumer needs to replace when the phone's battery is depleted. In another example, U.S. Pat. No. 6,709,784 discloses a unique battery pack that can be plugged into a cellular phone's contact to recharge the phone's built-in rechargeable battery and/or directly power the cell phone. This invention bundles the battery with the plug that allows the battery pack to be connected to the phone. Consequently, when the battery pack's battery is depleted the entire battery pack, including the plug, must be discarded which increases the consumer's cost.

Therefore, there exists a need for a portable direct current power supply that uses a commonly available battery that the consumer can readily insert into and remove from a reusable housing. The power supply needs to be lightweight, volume efficient and easily adaptable to a wide array of cell phones that utilize batteries of various shapes and sizes.

BRIEF SUMMARY OF THE INVENTION

The present invention provides a portable direct current power supply that can be used to supply an electric current to a handheld electronic device, such as a cellular telephone, that utilizes a battery that has a unique size and shape. The present invention is small, light weight, and inexpensive to operate.

According to a first aspect of the present invention, a portable electrochemical power supply includes a housing having an interior surface and an exterior surface, an electrical connector disposed through the housing, the connector having a first end accessible from the exterior surface. The power supply also includes a circuit board disposed within the housing. The circuit board is in electrical connection with both the electrochemical cell and the connector, receives an input voltage from the cell less than 1.90V and provides an output voltage through the connector greater than 3.00V. The housing includes at least two sections joined to one another a cavity adapted to removably receive an electrochemical cell.

According to another aspect of the invention, a process for providing an electric current to a battery powered device includes providing a battery powered device having at least one port physically and electrically configured to receive an electric current from an external power supply, selecting an electrochemical cell having a first terminal, a second terminal and an initial unaltered open circuit voltage less than 1.90 V, providing a housing for at least one circuit board and the electrochemical cell, disposing the cell inside the housing, securing a cover over the open end of the housing, providing an elongated electrically conductive connector, securing the elongated connector to the housing and to the device's port thereby establishing an electrical connection between the housing and the device, and allowing the assembled housing, elongated connector and device to remain connected while the circuit board receives an input voltage from the cell and provides an output voltage to the device. The input voltage is less than 1.90V and the output voltage is greater than 3.00V. The housing includes an open end, a sidewall and a closed end. The circuit board is capable of transforming an electrochemical cell's voltage from a first voltage to a second higher voltage. The housing also includes an electrically nonconductive first section defining the closed end of the housing and through which the electrical connector is disposed and an electrically conductive second section including the sidewall.

According to still another aspect, a portable battery powered power supply includes a first housing portion having a first end which includes a first opening and a second end, a second housing portion having a third and fourth ends and a battery receiving region disposed therebetween, a circuit board, and a power supply circuit carried by the circuit board. The power supply circuit includes an input which receives electrical energy from a first battery and an output which provides electrical energy to a battery powered device. The power supply also includes a first battery contact carried by the circuit board and which is in electrical communication with the input of the power supply circuit, an electrical connector carried by the circuit board and which is in electrical communication with the power supply output, and a second battery contact adapted to make electrical contact with a terminal located at the second end of the battery. The third end faces the first housing portion, the first battery contact is adapted to make electrical contact with a terminal located at a first end of a battery received in the battery receiving region, and the electrical connector is accessible to an exterior of the power supply through the first opening.

According to another aspect, a portable battery powered power supply is adapted to selectively receive first and second generally cylindrical batteries and supply electrical energy to an external portable battery powered device through an electrical connector. The power supply consists essentially of first, second, and third cover portions which lockingly engage so as to form a unitary assembly having a battery receiving region, a circuit board, a fourth cover portion, first and second user operable attachment members carried by the fourth cover portion and which are adapted to removably attach the fourth cover portion to the unitary assembly, and a mechanically resilient, electrically conductive member carried by the fourth cover portion. The circuit board carries power supply circuitry, the electrical connector, a first battery contact adapted to make electrical contact with a terminal located on a first end of the first battery, and a second battery contact adapted to make electrical contact with a terminal located at a first end of the second battery. The mechanically resilient, conductive member is adapted to provide an electrical connection between terminals located at a second end of the respective first and second batteries. The mechanically resilient, conductive member is in operative mechanical communication with the latch members.

According to still another aspect, a portable battery powered power supply includes a first polymeric cover portion, a second polymeric cover portion which lockingly engages the second cover portion so as to form a unitary assembly which includes a cavity adapted to receive a battery, a circuit board, and power supply circuitry carried by the circuit board. The power supply circuit includes an input which receives electrical energy from a battery and an output for providing electrical energy to an external device. The power supply also includes a first electrical connector carried by the circuit board and which is in electrical communication with the output of the power supply circuitry, a first battery contact carried by the circuit board and which is in electrical communication with the input of the power supply circuitry, a third polymeric cover portion which latchingly engages the unitary assembly so as to allow a user to selectively access the cavity, and a second battery contact carried by the third cover portion. The first electrical connector is adapted to provide a removable electrical connection to a corresponding external connector, the first battery contact is adapted to provide an electrical contact with a terminal located at a first end a battery received in the cavity, and the second battery contact is adapted to provide an electrical contact with a terminal located at a second end of the battery.

According to another aspect of the present invention, a method of assembling a battery powered power supply includes installing first and second human operable attaching members and a mechanically resilient, electrically conductive member in a first cover portion so that the conductive member urges the attaching members toward an interior surface of the first cover and provides a first battery contact. The method also includes snappingly attaching a second cover portion to a third cover portion to form a housing having first and second ends and a battery receiving region disposed therebetween, inserting a circuit board which carries an electrical connector, a second battery contact, and electrical circuitry which receives electrical energy from a battery and generates a power supply output for providing electrical energy to an external device in a fourth cover portion so that the electrical connector aligns with a first opening in the fourth cover portion. The method further includes snappingly attaching the fourth cover portion to the first end of the housing and using the attaching members to removably attach the first cover portion to the second end of the housing.

According to another aspect, a method of assembling a portable battery powered power supply includes placing a circuit board which carries an electrically conductive member, an electrical connector, a first battery contact, and electrical circuitry which receives electrical energy from a battery and generates a power supply output for providing electrical energy to an external device in a first cover portion so that the electrical connector aligns with a first opening in the first cover portion. The method also includes attaching the first cover portion to a second cover portion having first and second ends and a battery receiving region disposed therebetween so that the electrically conductive member makes an electrical contact with the first end of the first housing, and removably attaching a third cover portion which carries a second battery contact to the second end of the housing.

Still other aspects of the present invention will be understood by those skilled apart upon reading and understanding the appended description and drawings.

DETAILED DESCRIPTION OF THE INVENTION

Figure 1:
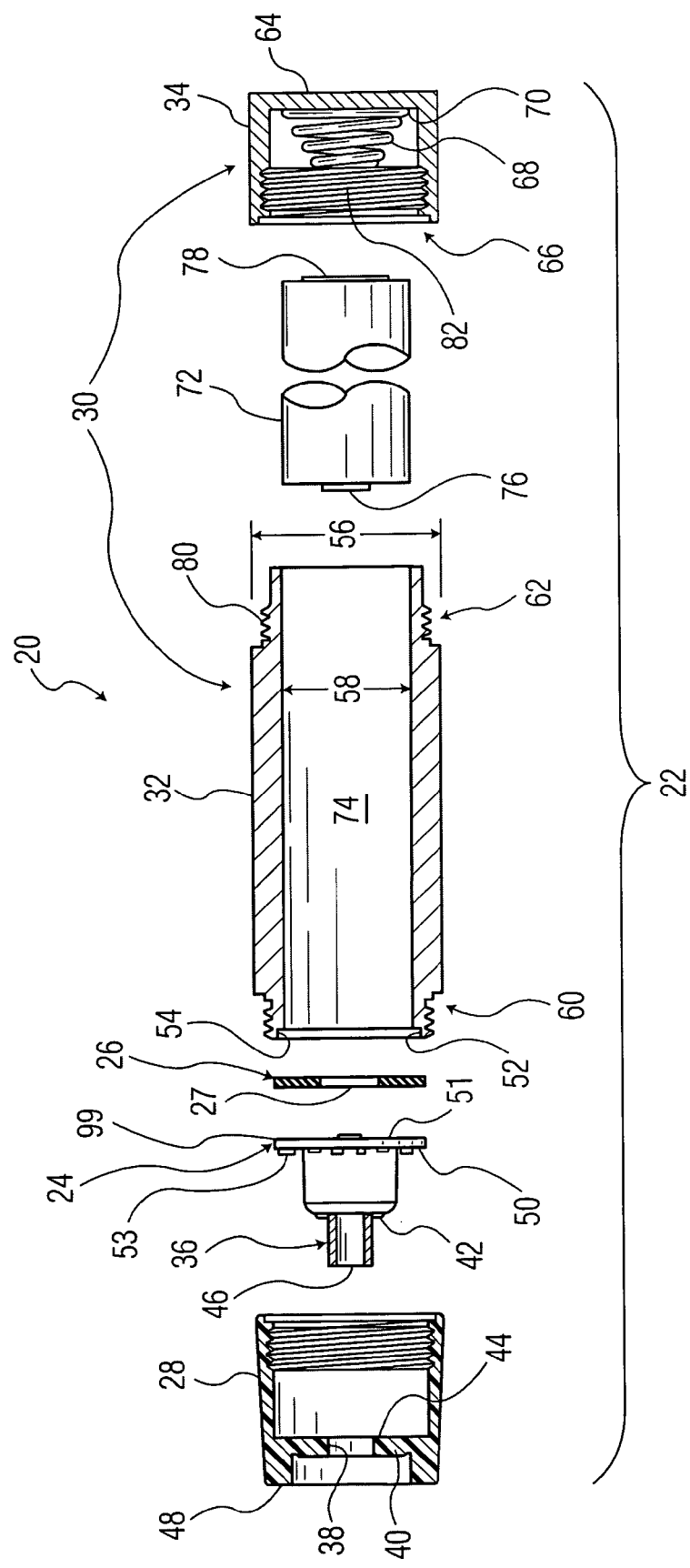
FIG. 1 is an exploded cross-sectional view of a portable power supply.

Referring now to the drawings and more particularly to FIG. 1, there is shown a cross-sectional view of a disassembled portable power supply 20 of this invention. The power supply generally comprises housing 22, circuit board 24, insulating ring 26, and electrochemical cell 72. Housing 22 includes an electrically nonconductive first section 28 and an electrically conductive second section 30 which can be further divided into first subsection 32 and second subsection 34. First section 28 is made of an electrically nonconductive and transparent material that will allow the consumer to view components on the circuit board. Second section 30 is made of aluminum which is an electrically conductive material. First section 28 and second section 30 can be secured to one another. Circuit board 24, commonly known as a printed circuit board (PCB), generally includes a thin electrically nonconductive disc shaped base member with a first planar surface 50 and a second planar surface 51. Electronic components, such as resistors, diodes, voltage modifiers, etc. are printed and/or otherwise attached to either of the base member's planar surfaces. Secured to the first surface are a tubular metal contact 36 and a light emitting diode 53. Secured to the circuit board's second surface is an arc shaped electrically conductive contact 99 positioned adjacent at least a portion of the board's perimeter. The arc shaped contact 99 on the second surface is in electrical contact with the electronic circuitry (not shown) secured to either the first planar surface and/or the second planar surface. A portion of the circuit board's tubular metal contact 36 extends through opening 38 in interior wall 40. The diameter of opening 38 is larger than the outside diameter of the tubular metal contact's distal end 46 but smaller than the diameter of flange 42 which abuts the inside surface 44 of wall 40 thereby limiting the distance which the tubular contact can extend through the opening. Wall 40 is sufficiently recessed to prevent the distal end 46 of tubular contact 36 from extending beyond the plane defined by the rim 48 of nonconductive first section 28. The insulating ring, which has an inner diameter that defines the size of opening 27 and an outer diameter, is made of an electrically nonconductive material. Ring 26 abuts the bottom 51 of circuit board 24 and ledge 52 in first subsection 32. The leading edge 54 of first subsection 32 extends past ring 26 and makes an electrically conductive contact with the arc shaped electrically conductive contact 99 on the bottom surface of circuit board 24 when the power supply is assembled. First subsection 32 has an outer diameter 56, an inner diameter 58, a leading end 60 and a trailing end 62. Both the leading and trailing ends are threaded to facilitate removably securing first subsection 32 to first section 28 and second subsection 34, respectively. Second subsection 34, also referred to herein as a cover, is a cup shaped component having a closed end 64 and a threaded opening 66 opposite the closed end. A coiled electrically conductive metal spring 68 is secured to the bottom inside surface 70 of cover 34.

Figure 2:
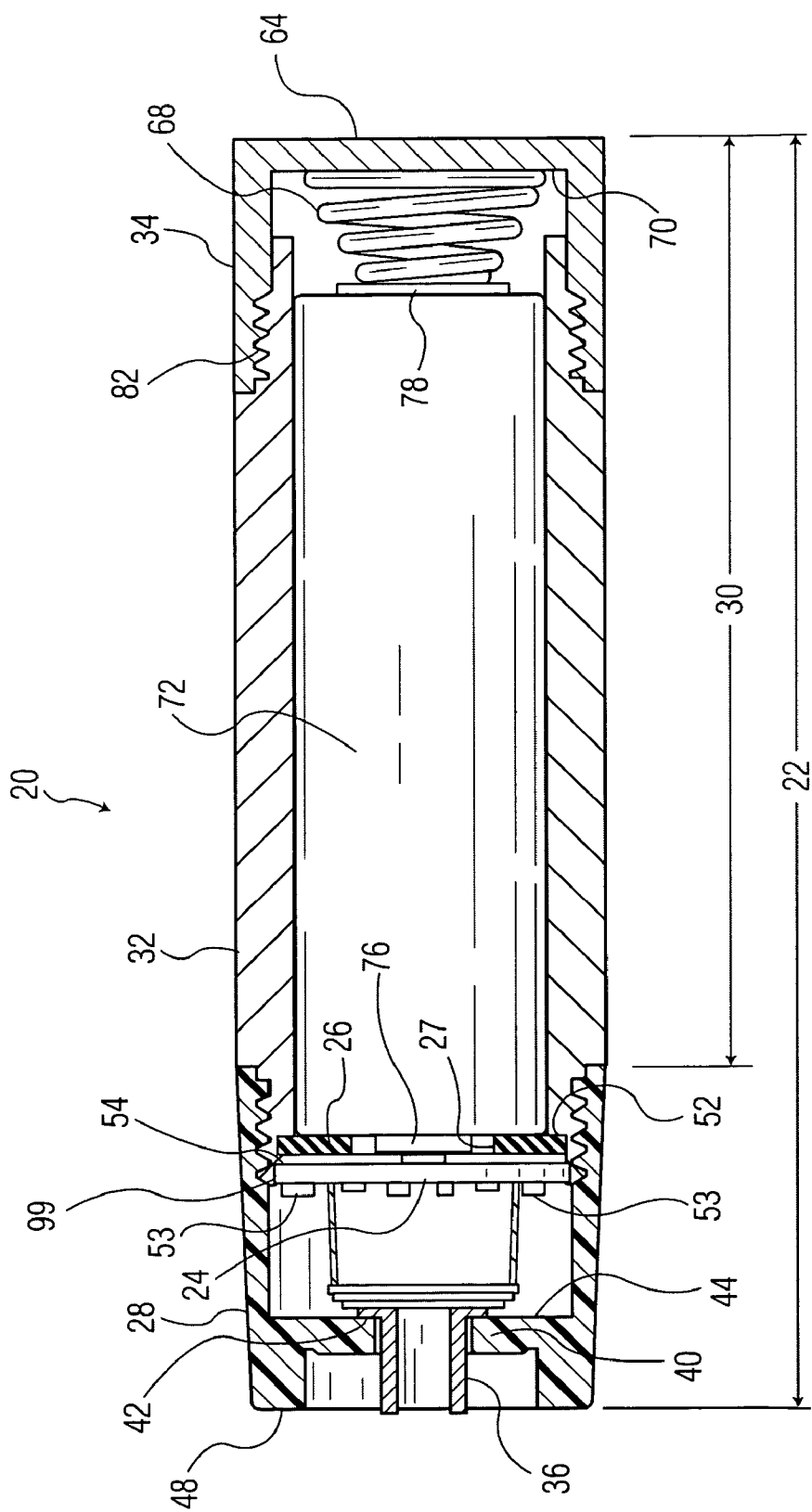
FIG. 2 is a cross-sectional view of an assembled portable power supply.

The assembled power supply disclosed in FIG. 2 may be assembled as follows. Circuit board 24 is oriented and inserted into the housing's first section 28 so that the tubular metal contact projects through opening 38 in the first section's interior wall 40 until the tubular contact's flange 42 abuts the interior surface 44 of wall 40. Insulating ring 26 is then inserted into the leading end 60 of the housing's first subsection 32. The outer diameter of disc 26 is slightly larger than the first inside diameter 58 of first subsection 32 and slightly smaller than the inside diameter of ledge 52 thereby insuring that disc 26 rests upon ledge 52 and does not block the leading edge 54 of first subsection 32. First section 28 is then secured to first subsection 32 by threading the first section onto the first subsection thereby trapping disc 26 and establishing an electrical path between the first subsection's leading edge 54 and the peripheral contact on the bottom surface 51 of circuit board 24. To minimize the cost and volume of the power supply, the housing was designed to eliminate a separate wire or other electrical conductor that could have been used to complete the electrical circuit from the cell's second terminal to the circuit board. This was accomplished by constructing first subsection 32 and second subsection 34 of aluminum which is an electrically conductive material. Other electrochemically conductive materials, such as nickel plated steel, copper or brass could be used instead of aluminum. If desired, the housing could be made of an electrically nonconductive material, such as plastic, provided an electrically conductive path is provided between the cell's second terminal and the circuit board. The electrically conductive path could be a thin, elongated strip of brass secured to the interior surface of the nonconductive housing and which wraps around or otherwise terminates at the leading edge 54 of the housing so as to make electrical contact with the arc shaped contact 99 of the PCB. Electrochemical cell 72 is then inserted into cavity 74 so that the cell's first terminal 76 extends through opening 27 in insulating disc 26 and contacts a centrally located electrical contact on the bottom surface of circuit board 24. The disc prevents electrical contact between the first terminal and other electronic components that may be located on the bottom of the circuit board. Second subsection 34, also referred to herein as a cover, is then secured to the trailing end 62 of first subsection 32 by manually rotating the cover around the periphery of the first subsection's outer wall so that the threaded ridges 80 on the outer surface of the first subsection engage the grooves 82 in the inner surface of the cover. Spring 68 forces the cell toward the circuit board thereby insuring the establishment and maintenance of good physical contact between the cell and the circuit board while also providing an electrically conductive path between the cell's second terminal and the cover.

Secured to the circuit board are the components of an electronic circuit 300. The components may be secured to the circuit board's first side 50, which is the side of the circuit board furthest away from the electrochemical cell, or to the circuit board's second side 51, which is located closest to the cell.

A first portion of the circuit functions as a sensing circuit and a second portion of the circuit functions as a boost circuit. The basic function of the sensing circuit is to detect the presence of a battery powered device to which the power supply is connected and then determine whether or not the electrochemical cell secured within the power supply's housing will be able to provide a current with sufficient amperage and voltage to operate the device and/or recharge a rechargeable battery that forms a part of the device. If one or more of the device's electrical characteristics that the sensing device can detect, such as electrical resistance, is not acceptable to the sensing circuit, the sensing circuit will not allow the boost circuit to supply power to the device. Similarly, if the sensing circuit determines that the cell's electrochemical capacity has been sufficiently depleted to prevent the cell from providing an adequate current to the boost circuit, then the sensing circuit will not allow the boost circuit to operate. In one embodiment, the sensing circuit can be made to attempt to detect the presence of a suitable device and electrochemical cell approximately two times per second. From the consumer's point of view, the power supply is always "on". However, since the drain on the cell that powers the sensing circuit is very small the cell can power the sensing circuit for long periods of time before the cell must be replaced.

The function of the boost circuit is to transform the cell's voltage, which is also referred to herein as the boost circuit's input voltage, from a first voltage to a second higher voltage. Preferably, the boost circuit's input voltage, which is defined as the cell's closed circuit voltage prior to discharging the cell in any circuit that depletes more than one percent of the cell's theoretical electrochemical capacity, is below 1.90V. The boost circuit receives the cell's energy, which has a voltage below 1.90V, and transforms it to produce an output voltage greater than 3.00V which is the minimum voltage needed to power many commercially available cellular telephones. If desired, the boost circuit could be configured to transform the output voltage to a different voltage such as 3.60V. The boost circuit is not activated until the sensing circuit determines that the cell's output voltage and the device's electrical characteristics meet predefined criteria such as a minimum closed circuit voltage for the cell and a maximum electrical resistance for the device.

Figure 5:
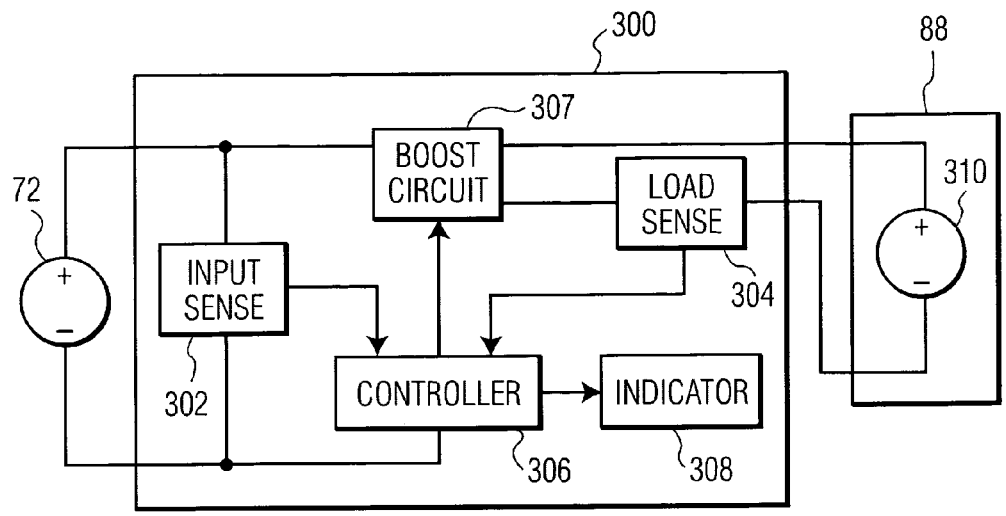
FIG. 5 is a functional block diagram of an electronic circuit.

With reference to the functional block diagram of FIG. 5, the electronic circuit 300 is in operation operatively connected between the electrochemical cell 72 and a battery 310 which powers an electrical device 88 such as a cellular telephone.

The electronic circuit 300 is powered by the electrochemical cell 72. The electronic circuit 300 converts the energy provided by the electrochemical cell 72 to a voltage and current level suitable for providing power to the electrical device 88.

In one embodiment, the electronic circuit 300 receives input power from an alkaline AA cell having a nominal voltage of 1.5 volts direct current (VDC) and produces an output voltage greater than about 3.0 volts direct current (VDC). More particularly, the circuit 300 provides charge current to a lithium ion battery 310 having a nominal voltage of 3.6 volts direct current (VDC). The electronic circuit 300 includes a controller 306 operatively connected to charging/boost circuitry 307 which in turn provides electrical energy to the lithium ion battery 310. Input sense circuitry 302 is operatively connected to the electrochemical cell 72 and provides the controller 306 with an indication of the voltage supplied by the cell 72. Load sense circuitry 304 is operatively connected to the load 310 and provides the controller 306 with a signal indicative of the current drawn by the load 310. A human readable indicator 308 such as one or more light emitting diodes (LEDs) indicates the status of the power supply.

Figure 6:
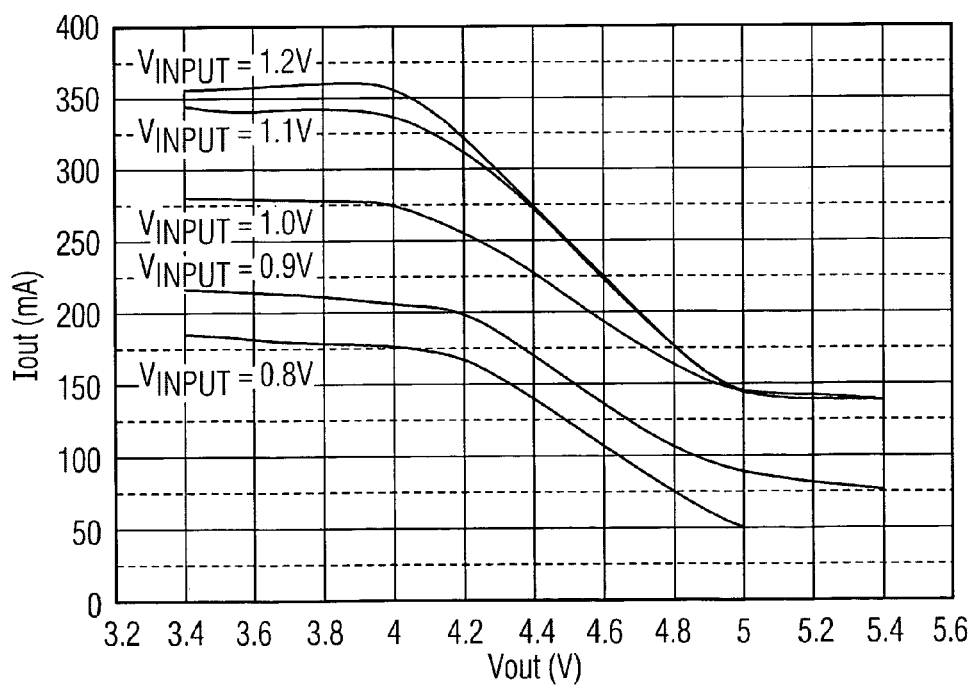
FIG. 6 depicts the transfer function of an electronic circuit.

An exemplary graph showing the relationship between the output current and voltage supplied to the lithium ion battery 310 and the input voltage supplied by the electrochemical cell 72 is shown in FIG. 6. Over a first range of voltages near the nominal 3.6 volt direct current (VDC) voltage of the lithium ion battery 310, the circuit 300 functions as a current source to provide a substantially constant charging current to the battery 310. As the battery 310 voltage increases with increasing battery charge, the current supplied to the battery 310 is reduced until the battery 310 is substantially charged.

With continuing reference to FIG. 5, the electronic circuit 300 also includes input sense circuitry 302 which senses the input voltage provided by the electrochemical cell 72. Above a first threshold voltage, for example approximately 1.1 volts direct current (VDC), the current supplied by the charging circuitry 307 remains substantially constant as a function of input voltage. As the cell 72 voltage decreases, the current supplied by the charging circuitry 307 likewise decreases. As the cell 72 voltage decreases below a second threshold, for example approximately 0.6 volts direct current (VDC), the controller 306 enters an idle mode or low power mode in which the boost circuit 307 is disabled and the charging circuitry 307 no longer supplies power to the lithium ion battery 310.

The load sensing circuitry 304 senses the presence of a load at the circuit's output. If no load is detected, the controller 306 enters an idle or low power mode in which the boost circuitry 307 is disabled so as to conserve energy in the cell 72. If, on the other hand, the load sensing circuit 304 indicates the presence of a suitable load, the boost circuit is enabled, and the electronic circuitry 300 provides a recharging current to the battery 310. The controller 306 causes the indicators 308 to flash to indicate that the device is providing power to the load.

In one embodiment, the electronic circuit 300 is implemented using the TEC103 integrated circuit available from Techtium Ltd. of Tel Aviv, Israel. Of course, other embodiments of the circuit can also be implemented.

While the above description has focused on recharging the lithium ion battery 310, the electronic circuit 300 may also provide an additional or auxiliary power source while the electrical device 88 is operational, or may be used to power the device directly.

Other embodiments of the electronic circuit 300 may also be implemented. Thus, for example, the circuit may be configured to provide voltage and/or current levels suitable for charging battery technologies other than lithium ion. The circuit may be configured to provide a suitable voltage and/or current to directly power a load in the absence of a battery 310. Moreover, one or both of the input and load sense functions may be omitted.

Figure 3:
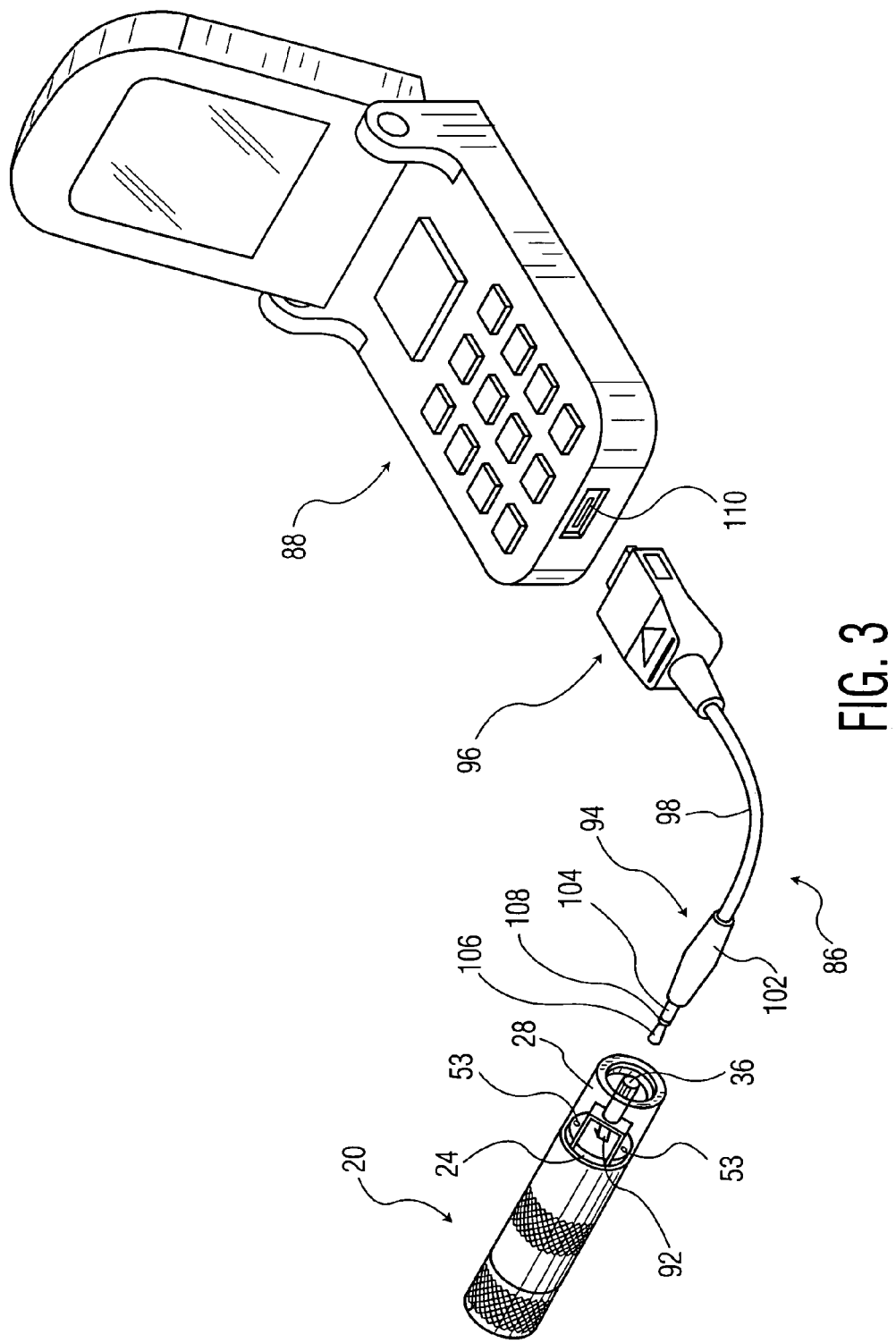
FIG. 3 shows a perspective view of a portable power supply, flexible connector and cellular phone.

Shown in FIG. 3 is an exploded view of the following three articles: a portable power supply 20 of this invention; an elongated, flexible, electrically conductive connector 86; and a cellular telephone 88. Power supply 20 includes a transparent first section 28 through which can be seen two light emitting diodes 53; tubular metal contact 36 and circuit board 24. Located between one end of tubular contact 36 and printed circuit board 24 is spring contact 92 which is electrically isolated from tubular contact 36. Spring contact 92 is electrically connected to one of the electrochemical cell's terminals and tubular contact 36 is electrically connected with the cell's other terminal. Flexible connector 86 includes first connecting means 94 on one end thereof and second connecting means 96 on the opposite end thereof. The connecting means are electrical plugs that can be used to establish electrical connection between a power supply and a device. The two plugs are electrically connected and physically secured to one another by a flexible wire that includes a metal conductor coated by an electrically nonconductive material. First connecting means 94 includes an outer insulated portion 102, a first conducting portion 104, a second conducting portion 106 and an insulating sleeve 108. First conducting portion 104 is a tubular metal contact that is designed to form an interference fit with the inside diameter of tubular contact 36. Insulating sleeve 108 lines the inside surface of first portion 104 and extends slightly beyond the distal end of first portion 104 thereby forming an electrically insulated path through which second conducting portion 106 extends. When the consumer grasps outer insulated portion 102 and inserts first connecting means 94 into the power supply's tubular metal contact 36, first conducting portion 104 establishes electrical contact with tubular contact 36 and second conducting portion 106 establishes electrical contact with spring 92. Second conducting means 96 is sized to fit in the cavity defined by port 110 in cellular telephone 88. Because manufacturers of cellular phones may use one of several different ports, and each port is uniquely sized relative to the other ports, the consumer needs to select a flexible electrically conductive connector that has a second connecting means that is properly configured to match the port in their phone. If a consumer needs to sequentially power two different cellular telephones with different size ports, such as could occur when the consumer exchanges their old cell phone for a new cell phone, the power supply is still usable provided a flexible connector that will fit the new phone is selected. When the flexible connector's first connecting means is plugged into the power supply's tubular contact and the second connecting means is plugged into the device's port, the power supply's sensing circuit detects the cellular phone and allows the power supply to send a current to the phone provided one or more predefined characteristics are detected by the sensing circuit.

Figure 4:
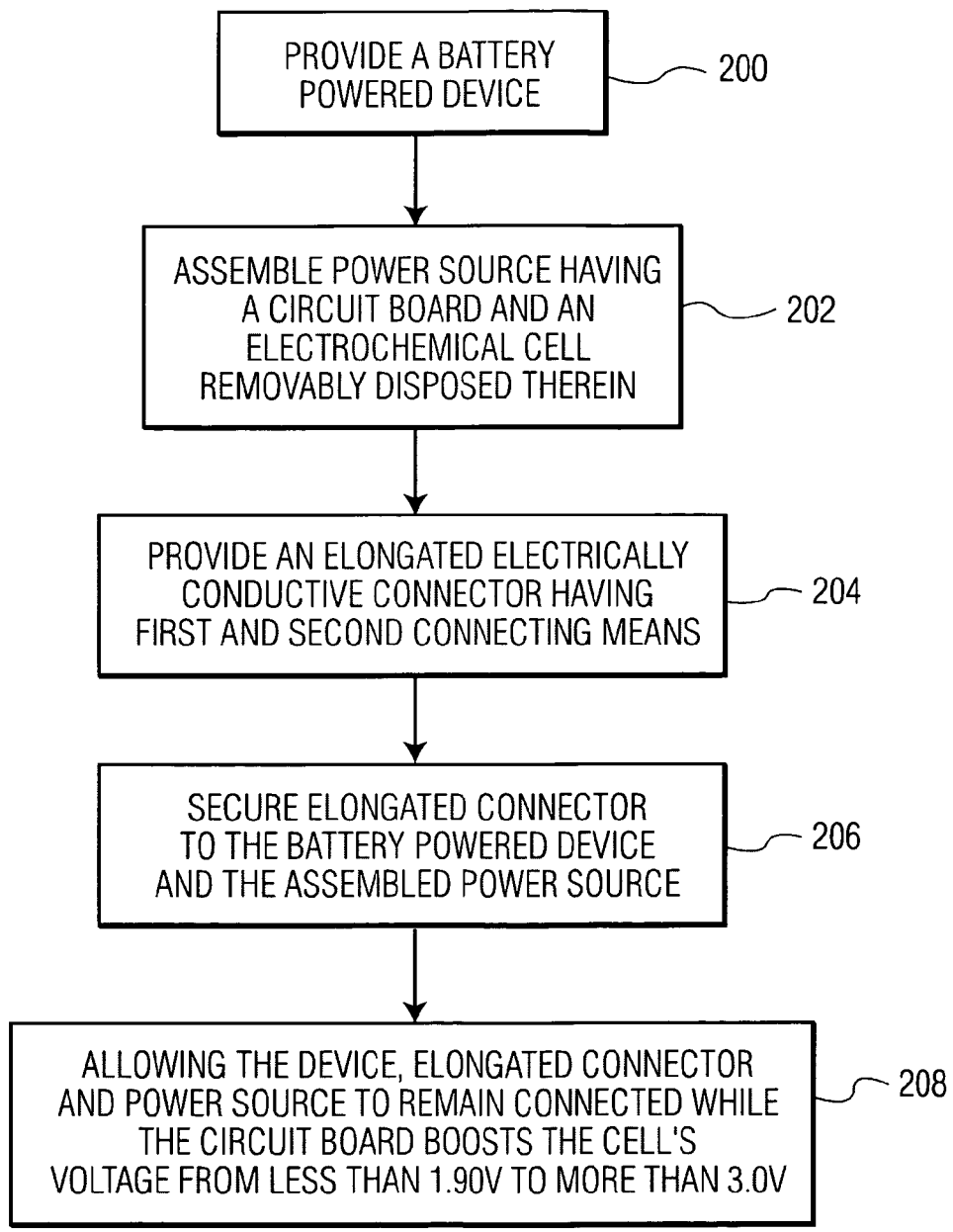
FIG. 4 shows a flow chart of a process of this invention.

As shown in FIG. 4, a process of this invention includes the following steps. In step 200, providing a battery powered device. The device includes a port to which an electrically conductive connecting means can be secured. In step 202, assembling a portable power supply. The power supply includes a housing having a removable electrochemical cell disposed therein. In step 204, an elongated electrically conductive connector is provided. The connector has a first connecting means secured to one end and a second connecting means secured to the other end of the connector. Step 206 represents securing the first connecting means to the power supply and the second connecting means to the device's port. In step 208, the device, elongated connector and power supply are allowed to remain connected while the printed circuit board receives an input voltage from the cell and provides an output voltage to the device wherein the input voltage is less than 1.90V and the output voltage is greater than 3.00V.

A preferred battery for use in a portable direct current power supply of this invention is a single primary cylindrical battery that incorporates a single anode that includes lithium, a single cathode that includes iron disulfide and a nonaqueous electrolyte. The preferred battery has a jellyroll construction wherein strips of the anode (lithium), cathode (iron disulfide) and separator are rolled to form a coil which is then inserted into the container that forms the body of the cell. Jellyroll cells are known to have high anode-to-cathode interfacial surface area which facilitates high rate discharge. In a preferred embodiment, at least 20 percent of the cell's theoretical electrochemical capacity is discharged at 1.40V or higher and the cell has an initial unaltered open circuit voltage between 1.50V and 1.90V. Other suitable cell chemistries include: (1) a primary cylindrical cell that incorporates zinc, an alkaline electrolyte and one or more electrochemically active materials selected from the group consisting of manganese dioxide, nickel oxyhydroxide and silver oxide; (2) a metal/air cell that incorporates zinc, an alkaline electrolyte and has air access port(s) and/or an air manager; (3) rechargeable cells that utilize an alkaline electrolyte and electrodes that include nickel and cadmium or nickel and a metal hydride; and (4) cells that utilize a zinc anode, manganese dioxide in the cathode and an acidic electrolyte. To accommodate commercially available cell sizes, the power supply's housing is made to define a cylindrical cavity that will accept a single electrochemical cell, also referred to herein as a battery, such as an R6 (AA), R03 (AAA), R14 (C) or R 20 (D) size battery. Because the power supply utilizes commonly available batteries, there is no need to purchase several uniquely shaped batteries to power several different devices owned by a consumer. The power supply of this invention allows the consumer to use a single power supply to sequentially power many different devices.

One of the issues that may need to be considered in the design of a power supply that includes an electrochemical cell is the management of heat that is generated when the cell is discharged. For example, when an R6 size battery that includes zinc, manganese dioxide and an alkaline electrolyte is continuously discharged at a one amp constant current drain rate, the exterior surface of the cell can heat up to 45° C. If the peripheral surface of the cell contacts the interior surface of the power supply's housing, heat will be conductively conveyed to and through the cell's housing. If the power supply is then picked up by an unsuspecting consumer, such as a child, the elevated temperature of the power supply's housing could cause the consumer to suddenly drop the power supply resulting in harm to the consumer and/or damage to the power supply and/or device. One way to safely manage the heat generated by the battery is to minimize the contact between the recently discharged cell and the interior surface of the housing, particularly the amount of contact between the interior surface of the housing's sidewall and the battery's circumferential surface. Preferably, contact between the cell's circumferential surface area and the sidewall of the housing is limited to less than 5% of the cell's circumferential surface area which would insure that at least 95% of the cell's circumferential surface area does not contact the interior surface of the housing. This can be accomplished by incorporating into the housing a mechanism that centers the cell in the cavity upon insertion of the cell and then keeps the cell centered in the cavity regardless of how the power supply is oriented by the consumer. For example, insulating disc 26 (see FIG. 1) could be made of a sufficiently thick material to allow for the formation of ridges and/or grooves in the bottom surface 51 thereof that would limit side-to-side movement of the cell's first terminal 76 thereby restricting lateral movement of the cell. Similarly, the interior bottom surface 70 of cover 34 could be contoured to engage ridges and/or recesses on the cell's second terminal 78 and thereby prevent lateral movement of the cell in the cavity. Another way to manage the transfer of heat from the cell to the power supply's housing is to insert a tubularly shaped thermal insulator between the cell and the interior surface of the housing's sidewall. The diameter of the tubularly shaped insulator would need to be greater than the diameter of the cell and less than the inside diameter of the housing. Alternatively, a thermally insulating material could be applied to the housing's exterior surface. Yet another way to manage heat transfer is to insure that the inside diameter of the housing is at least 5% larger than the outside diameter of the cell thereby insuring the existence of an air gap between the housing and the cell's circumferential surface area.

The housing of the power supply shown in FIG. 1 could be made with one or more openings through the housing to facilitate the movement of gases, such as oxygen and/or hydrogen, into or out of the housing. Certain batteries, such as cylindrical batteries that include powered zinc, manganese dioxide and an alkaline electrolyte, are known to produce hydrogen gas during discharge. The gas slowly escapes through the battery's housing by permeating through the cell's seal assembly. Openings through the power supply's housing will allow the gas to escape thereby avoiding a dangerous buildup of hydrogen gas in the power supply's housing. Another reason to incorporate openings through the housing is to allow oxygen in the air to access the electrochemical cell if the cell is an air cell which uses the oxygen as one of the cell's reactants. The oxygen would flow through openings in the power supply's housing and then through the openings in the electrochemical cell's housing where the oxygen could react with the cell's other electrochemically active material to produce an electric current. The openings could also be used to dissipate the heat generated by the cell as it is discharged.

Because the power supply of the present invention is intended for use by consumers in their day-to-day activities when the device and power supply may be temporarily stored in a purse, briefcase or coat pocket, the total volume occupied by the power supply needs to be minimized. Thus the volume occupied by the housing should be minimized relative to the volume occupied by the electrochemical cell. Preferably, the volume of the electrochemical cell should be at least 85% of the total volume occupied by the power supply. More preferably, the volume of the electrochemical cell should be at least 90% of the total volume occupied by the power supply. To accomplish this objective, a power supply of this invention is preferably designed to include an electrochemical cell having an outer diameter that is no less than 95% of the inside diameter of the cavity into which the cell is inserted.

The operation of a preferred power supply of this invention will now be described. A primary (nonrechargeable) battery having a first terminal electrically connected to a single anode, a second terminal electrically connected to a single cathode, and an unaltered open circuit voltage below 1.90V, is inserted through an opening into a partially enclosed housing that includes a printed circuit board and an electrical connector disposed through the housing. A cover is secured over the opening thereby providing an electrically conductive path between the cell's second terminal and an electrically conductive portion of the housing that establishes an electrical connection with the printed circuit board. The printed circuit board includes a sensing circuit that detects the presence of a properly inserted cell having a minimum voltage. The printed circuit board further includes a light emitting diode that is illuminated for a brief period of time to signal the consumer that the power supply is operational. The consumer then secures one end of an elongated electrically conductive connector to the power supply's electrical connector that extends through the housing and the second end of the elongated connector is secured to a cellular telephone's charging port. The power supply's sensing circuit detects the presence of a cell phone that can be recharged by the power supply and then activates the printed circuit board's boost circuit which increases the cell's voltage from less than 1.90V to 3.00V or higher. The power supplied by the power supply is used to recharge the cell phone's rechargeable battery and/or to directly power the cell phone. The sensing circuit monitors the cell's voltage and reduces or stops the power supply's output if the cell's voltage falls below a predetermined minimum voltage. For example, if the cell's voltage drops below a first threshold voltage, such as 1.10V, then the power supply's output is reduced. When the cell's voltage drops below a second threshold voltage, such as 0.60V, then the power supply's output is reduced to 0.0V.

Figure 7:
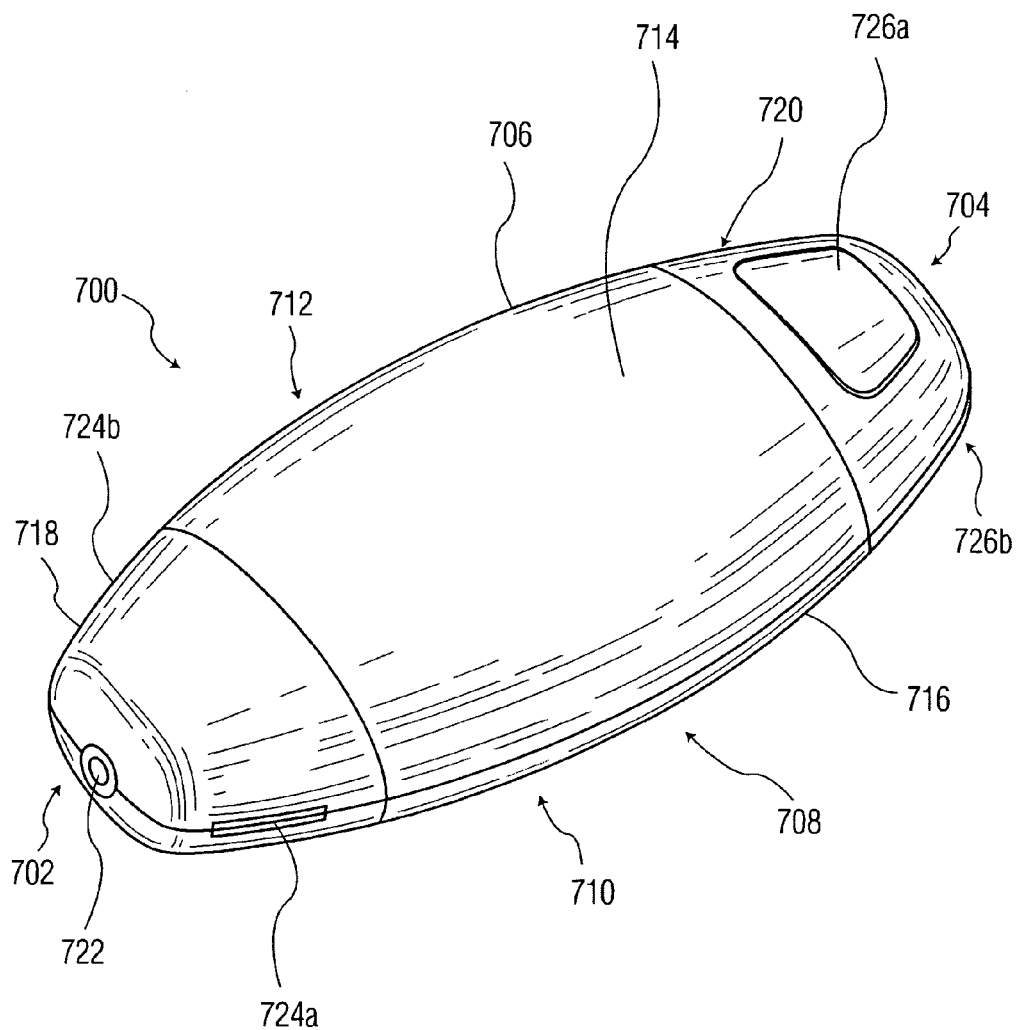
FIG. 7 is a top front perspective view of a portable power supply.

Turning now to FIG. 7, a portable power supply 700 has top 702, bottom 704, front 706, rear 708, and first 710 and second sides 712. As the power supply 700 is readily portable, the foregoing descriptions are intended to provide a consistent frame of reference with which to describe the power supply itself 700 and do not necessarily correspond to the reference frame of a user or otherwise to the external environment. As illustrated in FIG. 7, the power supply 700 is adapted to receive two (2) AA size cells. Also as illustrated, the power supply 700 has exterior dimensions of 83.4 millimeters length×41 millimeters wide×22.8 millimeters deep and takes the shape of an ovoid having generally flattened front 706 and rear 708 surfaces.

The power supply 700 includes a front cover 714, rear cover 716, a top cover 718, and a bottom cover 720 which may advantageously be molded or otherwise formed using a polymer such as acrylonitrile butadiene styrene (ABS). Accessible through an opening which is generally centered in the top surface of the top cover 718 is an electrical connector 722 such as a female jack. A first human readable status indicator 724a is visible on the first side 710 of the top cover 718. A corresponding second human readable status indicator 724b (see FIG. 9) is likewise visible on the second side 712. A first latch 726a is located at the front 706 of the bottom cover 720. A corresponding second latch 726b (again not visible in the perspective view of FIG. 7) is likewise located at the rear 708 of the bottom cover 720.

Figure 8:
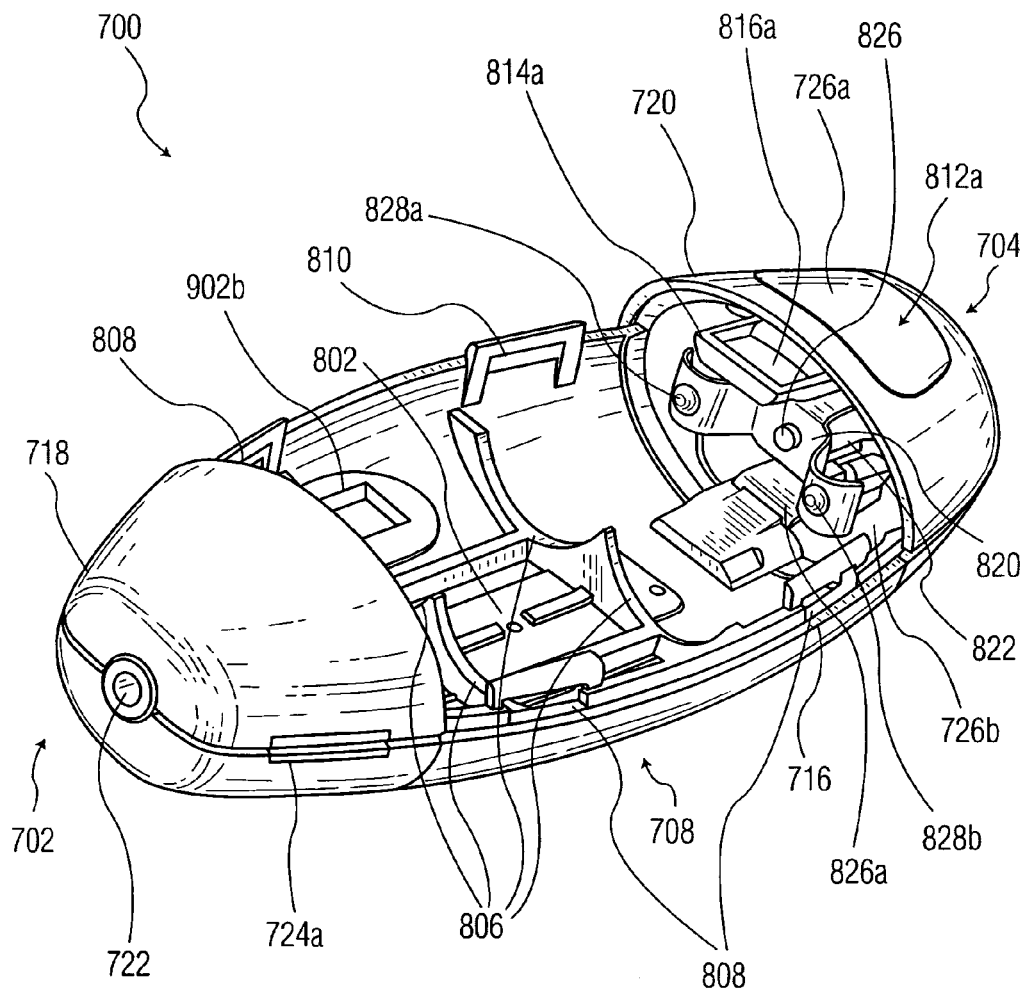
FIG. 8 is a top front perspective view of a portable power supply with a cover rendered transparent.
Figure 9:
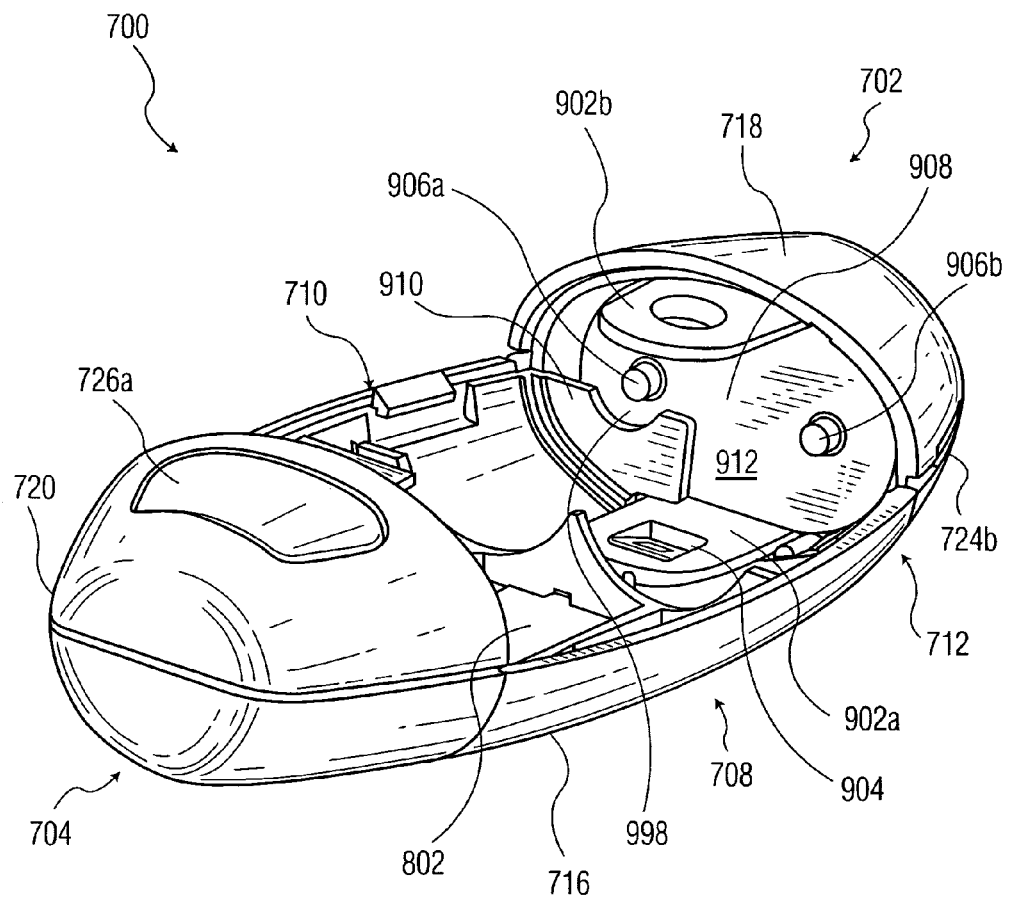
FIG. 9 is a bottom front perspective view of a portable power supply with a cover rendered transparent.

FIGS. 8 and 9 depict respective top front and bottom front perspective view of the portable power supply 700 with the front cover 714 rendered transparent for ease of illustration.

The portable power supply 700 includes a battery receiving region 802 adapted to receive first and second generally cylindrical batteries. The rear cover 716 includes front facing, generally arcuate battery supports 806. The front cover 714 contains similar, rear facing supports.

Protrusions 808 and recesses 810 disposed at the periphery of the rear cover 716 snappingly engage corresponding recesses and protrusions disposed at the periphery of the front cover 714. More particularly, the clips and recesses are configured to facilitate assembly of the cover portions 714, 718 into a unitary assembly but to resist ready disassembly by a user.

Figure 11:
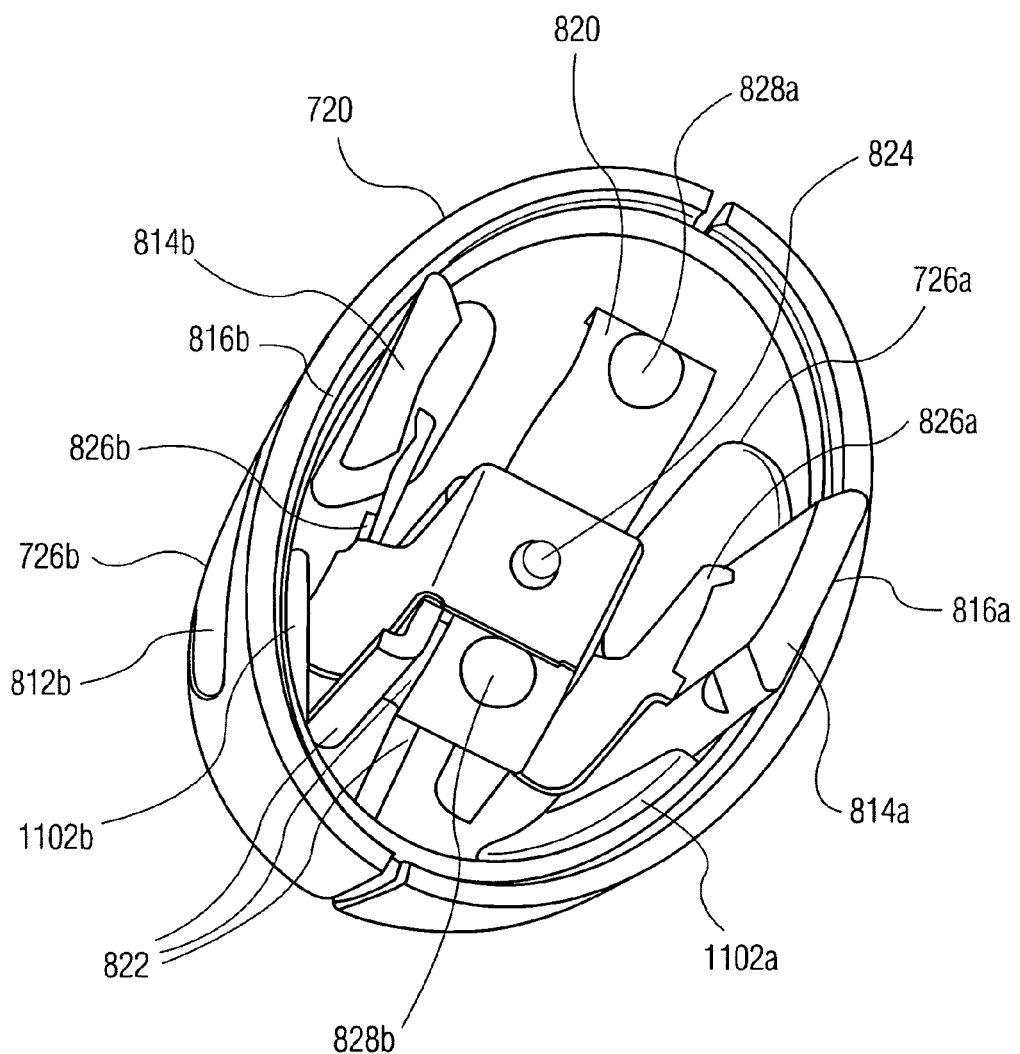
FIG. 11 is a perspective view of the interior of a bottom cover.

With additional reference to FIG. 11, the bottom cover 720 is removably attached to the power supply 700 so as allow a user to insert and remove the batteries. The bottom cover 720 carries the latches 726a, 726b, which are preferably identical, and the contact member 820.

The latches 726a, 726b include user operable actuating portions 812a, 812b which are accessible through respective material free regions in the bottom cover 720. As illustrated, the actuating portions 812a, 812b are substantially flush with the outer surface of the cover 720. The latches 726a, 726b also include shoulder portions 1102a, 1102b having a dimension greater than that of the material free regions and which aid in retaining the latches 726a, 726b in position inside the cover bottom cover 720.

The latches 726a, 726b also include cover engaging portions 814a, 814b which extend upwardly from the bottom cover 720. The cover engaging portions 814a, 814b include recesses 816a, 816b, material free regions, catches, or the like which engage corresponding protrusions disposed in the inner surface of the front 714 and rear 716 covers. The respective protrusions have generally curved or wedge shaped profiles so that the height of the protrusions is relatively lower near the bottom of the respective covers and relatively higher near the top. As will be appreciated, such an arrangement facilitates the assembly of the bottom cover 720 to the front 714 and rear 716 covers but prevents ready disassembly unless the actuating portions 812a, 812b are depressed. The cover engaging portion 814a, 814b may also be configured to provide a protrusion which engages a corresponding recess or latch portions on the covers 714, 716.

The contact member 820 is fabricated from an electrically conductive, resilient material such as AISI 302 chromium nickel stainless steel. The contact member 820 is supported by a boss 822 which extends generally inwardly from the bottom inner surface of the bottom cover. A post 824 extends through a corresponding aperture in the contact member 820 so as to aid in positioning the contact member 820. The post 824 may be heat staked or otherwise deformed so as to hold the contact member 820 in place. Other fastening techniques, such as a split post which snappingly engages the aperture, mechanical fasteners such as screws, adhesives, and/or interference fits are also contemplated.

The contact member 820 includes tabs 826a, 826b which engage corresponding slots or recesses in the inner portion of the latches 726a, 726b. The resilient nature of the contact member 820 tends to urge the latches 726a, 726b outwardly toward the bottom cover 720 until their respective shoulders 1102a, 1102b contact the inner surface thereof. The contact member 820 also includes first 828a and second 828b battery contacts which provide electrical connections to the terminals of batteries inserted in the battery receiving region 802. The resilient nature of the contact member aids in providing a reliable electrical connection with batteries installed in the battery receiving region 802.

As illustrated, the bottom cover 720 and associated components have rotational symmetry so that the contact member 820 may be installed in the bottom cover in either of two (2) 180° rotationally opposed positions; the cover latches 726a, 726b are interchangeable. Moreover, the bottom cover 720 may be likewise installed on the power supply in either of two (2) 180° rotationally opposed positions. A particular advantage of such a configuration is that assembly of and installation of the bottom cover 720 on the power supply 700 is simplified.

Figure 10:
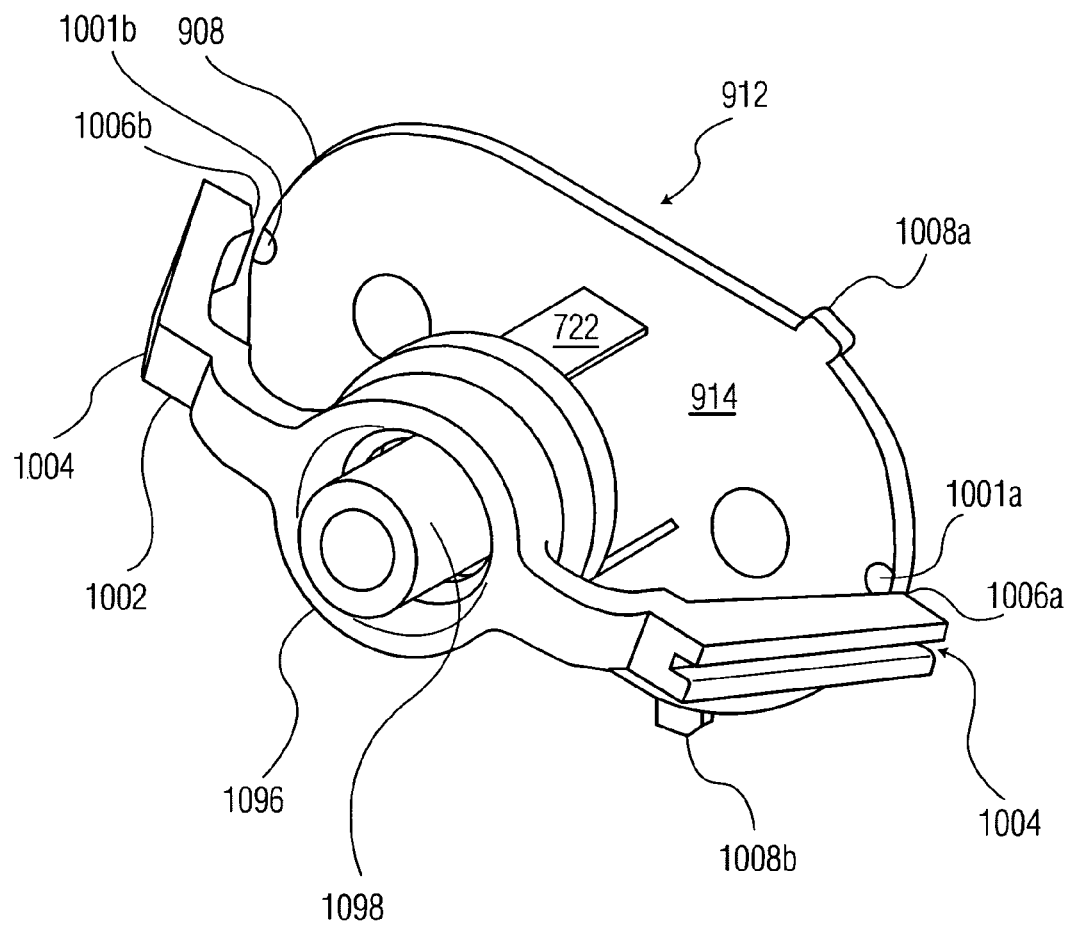
FIG. 10 is a perspective view of a printed circuit board and light pipe.

Returning now to FIGS. 8 and 9 and with additional reference to FIG. 10, the top cover 718 includes first 902a and second 902b attaching members which snappingly engage the rear 716 and front 714 covers, respectively. The attaching members 902a, 902b are preferably keyed so that the top cover 718 cannot be installed in the incorrect orientation. More particularly, the first attaching member 902a includes a generally square aperture which is adapted to engage a correspondingly shaped protrusion 904a on the inner surface of the rear cover 712. The second attaching member 902b likewise includes a generally circular aperture which is adapted to engage a correspondingly shaped protrusion on the inner surface of the front cover 714. The respective protrusions 904 have generally wedge shaped profiles so that the height of the protrusions is relatively lower near the top of the respective covers and relatively higher near the bottom. As will be appreciated, such an arrangement facilitates the assembly of the top cover 718 to the front 714 and rear 716 covers but prevents ready disassembly by the user or otherwise.

A PCB 908 is carried by the top cover 718. Disposed on a first side 912 of the PCB 908 are first and second battery contacts 906a, 906b which are adapted to make electrical contact with the respective terminals of batteries inserted in the battery receiving region 802. Battery polarity members 910, which extend from the inner surfaces of the front 714 and rear 716 covers, prevent the battery located nearer the first side 710 from being inserted with the improper polarity. More particularly polarity members 910 associated with each of the front and rear covers cooperate to form an aperture 998 of a size which allows the positive terminal of a desired size battery (AA in the illustrated embodiment) to protrude through the aperture 998 so as to contact the first battery terminal 906a. The aperture 998 has a dimension smaller than the outer diameter of the desired size battery so that the negative terminal cannot make such a contact.

The PCB 908 also carries power supply circuitry which converts the energy supplied by the batteries to the desired voltage and/or current levels at the power supply output. In one implementation, the power supply circuitry may function substantially as described above in connection with the circuit board 24 and the circuitry 300. As illustrated in connection with FIGS. 7-11, however, the batteries are connected electrically in series. Consequently, the power supply circuit input voltage is ordinarily twice that provided to the circuitry of circuit board 24 such that the operation of the circuitry 300 would be adjusted accordingly. One consequence of such an arrangement is that the power supply 700 may advantageously be used to supply GSM mobile phones and other electrical appliances having relatively higher power requirements than can be effectively supplied by only a single battery.

FIG. 10 depicts the second side 914 of the PCB 908, the connector 722, light sources 1001a, 1001b such as light emitting diodes (LEDs), and a light pipe 1002. The connector 722, which is electrically connected to the output of the power supply circuit, is carried on the second side 914 of the PCB 908. The connector 722 is positioned to align with a corresponding opening in the top cover 724 when the PCB 908 is installed in the power supply 700 so that the connector is accessible from the exterior thereof. Keys 1008a, 1008b, which engage corresponding slots in the inner surface of the top cover 718, prevent the PCB 908 from being installed in the incorrect orientation.

As illustrated, the connector 722 also includes a generally tubular or cylindrical portion 1098 which passes though a material free region of the light pipe 1002. The exterior of the light pipe 1002, which is fabricated from polycarbonate or other suitable material, has generally bow or arcuate shape which generally conforms to the shape of the top cover 718 so that the light pipe may be inserted therein. The exterior surface of the light pipe 1002 includes grooves or slots 1004 which engage corresponding bosses which protrude inwardly from the inner surface of the top cover 718 so as to aid in properly positioning the light pipe 1002.

Figure 12:
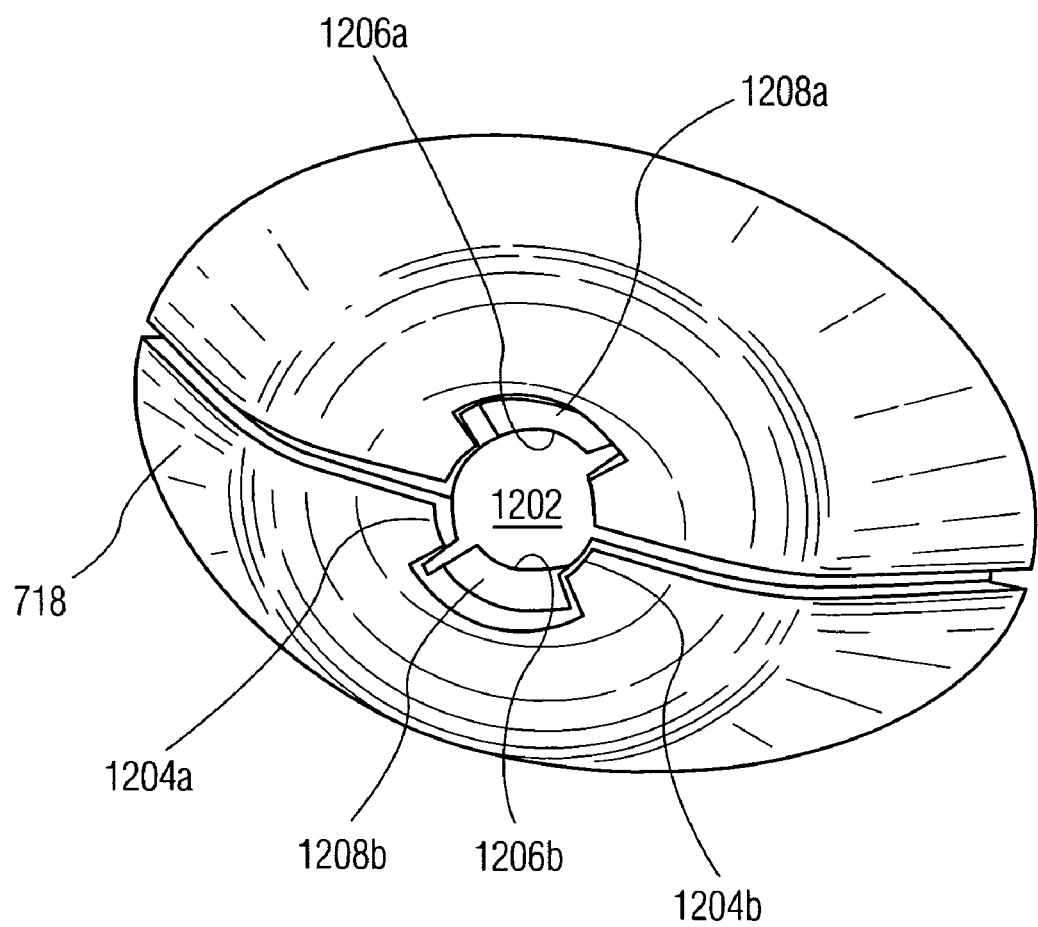
FIG. 12 is a perspective view of the exterior of a top cover.

The light sources 1001a, 1001b, which are electrically connected to the power supply circuit so as to provide an indication of the circuit status, are positioned so that, when the PCB 908 and the light pipe 1002 are installed in power supply, the light sources 1001a, 1001b are in optical communication with corresponding light receiving portions 1006a, 1006b of the light pipe 1002. The light pipe 1002 further aligns with a light transmissive or material free region of the top cover 718 so as to provide the status indicators 724a, 724b which are visible therethrough. Additionally, some or all of the annular portion 1096 of the light pipe 1002 may be disposed so as to be visible between the cylindrical portion 1098 of the connector 722 and the corresponding material free region of the top cover 718. Such an arrangement can be used to provide an additional human readable indication at the top of the power supply 700. As illustrated, the top cover 718 and light pipe 1002 have rotational symmetry so that the light pipe 1002 may be installed in the bottom cover in either of two (2) 180° rotationally opposed positions An alternative implementation of the top cover 718 which facilitates the use of a rotationally locking external connector is illustrated in FIG. 12. A described above, the top cover 718 includes an aperture 1202 which aligns with and provides access to the connector. As shown in FIG. 12, however, the cover includes 180° opposed shelf or lip portions 104a, 1204b located at or near the top surface of the top cover 718 at which the aperture 1202 has a relatively smaller diameter. Stated another way, the cover also includes 180° opposed material free regions 1206a, 1206b located at or near the top surface of the top cover 718 at which the aperture has a relatively larger diameter. Additional lips or shelves 1208a, 1208b which restrict the aperture to a smaller diameter are disposed below the material free regions 1206a, 1206b.

Figure 13:
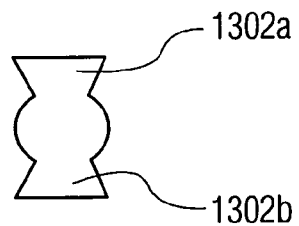
FIG. 13 depicts a cross section of a portion of a connector housing.

A portion of the housing of a corresponding external connector has the cross section shown in FIG. 13. The housing includes lips or shelves 1302a, 1302b which are sized to fit through the material free regions 1206a, 1206b. The location and depth of lips 1302a, 1302b are selected so that the connector may be inserted in the aperture 102 and rotated so as to prevent the external connector from being removed from the power supply 700. Though illustrated to provide a 90° rotationally locking connector, the aperture and external connector may readily configured to provide 180° or other desired locking actions. Such an arrangement may likewise be implemented in connection with cover 28.

In one embodiment, the front 714 and rear 716 covers and the latches 726 are provided in first color, while the top 718 and bottom covers 720 are provided in a second color. Logos, instructions, additional decorative features or other similar items may also be provided on the outer surface of the housings, for example through additional molded plastic pieces suitably fastened thereto. The top cover 718 especially may also be rendered translucent or transparent.

Still other variations are possible. For example, the power supply 700 may be configured to receive AAA, C, D, or other sized batteries. The power supply may also be configured to accept four (4) or more batteries, or also only a single battery, provided that an electrically conductive path is provided between the cell's second terminal and the PCB 908.

Figure 14:
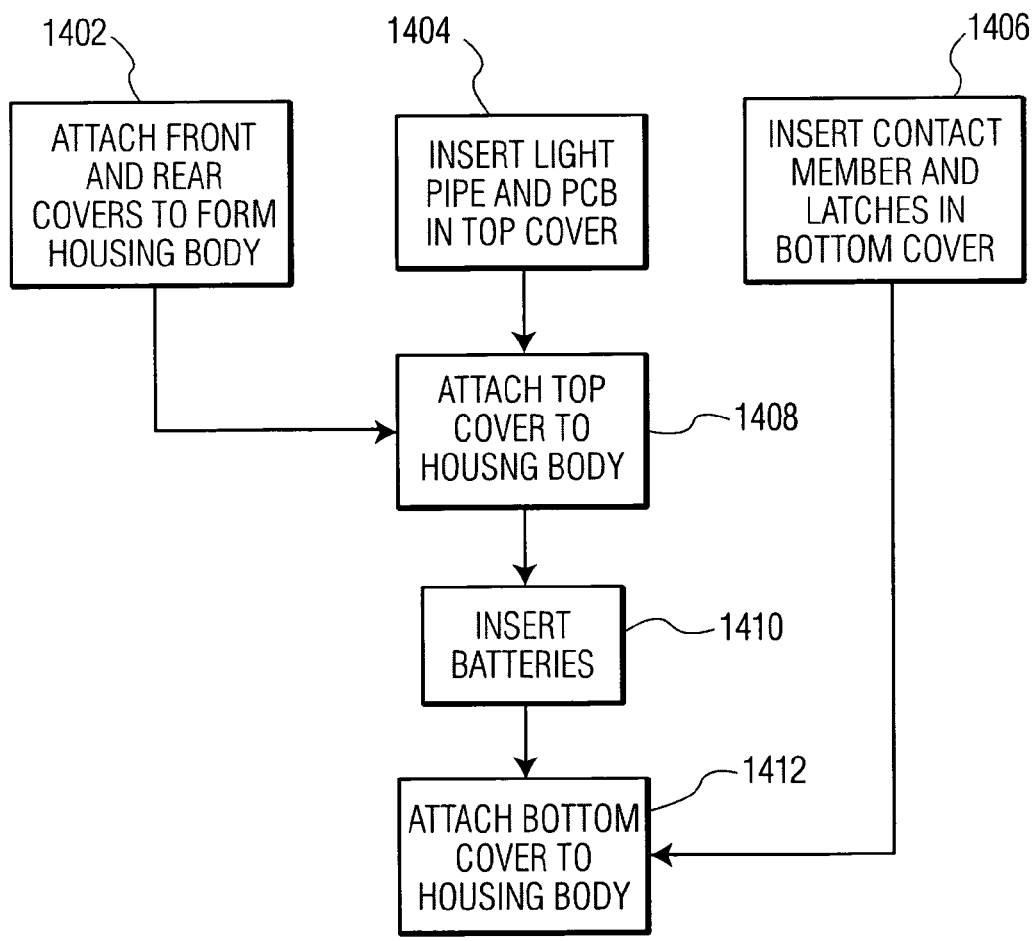
FIG. 14 depicts steps in assembling a power supply.

Assembly of the power supply will now be described in relation to FIG. 14. At 1402, the front 714 and rear covers 716 are attached to form a housing body. In the illustrated embodiment, the covers are snapped together such that the protrusions 808 and recesses 810 engage.

At 1404, the light pipe 1002 and PCB 908 are inserted in the top cover 718. Stated another way, the top cover is placed over the light pipe 1002 and PCB 908. Note that the light pipe may be installed in either of two 1800 opposed positions. The PCB, however, is keyed and may be inserted in only a single rotational position.

At 1408, the top cover 718 is attached to the housing body. In the illustrated embodiment, the pieces are snapped together such that the attaching members 902 engage their corresponding protrusions 904. Note that the top cover 718 and the housing body can be attached in only a single rotational position.

At 1406, the latches 726a, 726b and the contact member 820 are installed in the bottom cover 720. The post 824 may be heat staked or otherwise deformed as desired.

At 1410, the batteries may optionally be inserted in the battery receiving region 802. The polarity members 910 prevent the negative terminal of an improperly inserted battery from making electrical contact with the battery contact 906a.

At 1412, the bottom cover 720 is attached to the housing body. Note that the bottom cover 720 may be installed in either of two 180° opposed positions.

The lower cover 720 may be removed by depressing the actuating portions 812a, 812b of the latches 726a, 726b until the engaging portions 814a, 814b disengage from their respective protrusions and moving the lower cover 720 away from the remainder of the housing. The batteries are then removed from the battery receiving region through the resultant opening.

The above description is considered that of the preferred embodiments only. Modifications of the invention will occur to those skilled in the art and to those who make or use the invention. Therefore, it is understood that the embodiments shown in the drawings and described above are merely for illustrative purposes and are not intended to limit the scope of the invention, which is defined by the following claims as interpreted according to the principles of patent law, including the Doctrine of Equivalents.

What is claimed is:

1. A portable electrochemical power supply, comprising:
  (a) a housing having an interior surface and an exterior surface, wherein said housing comprises at least two sections joined to one another, and wherein the housing includes a cavity adapted to removably receive an electrochemical cell;
  (b) an electrical connector disposed through said housing, said connector having a first end accessible from said exterior surface;
  (c) a circuit board disposed within said housing, said circuit board in electrical connection with both the electrochemical cell and the connector, said circuit board receiving an input voltage from said cell less than 1.90V and providing an output voltage through said connector greater than 3.00V;

wherein said two sections comprise a first section and a second section, wherein said first section comprises said connector and defines a first end of said housing, wherein said second section is tubularly shaped and includes an open end and a closed end, and wherein said first section is removably joined to the open end of said second section.

2. The portable electrochemical power supply of claim 1 wherein said first section is electrically nonconductive and said second section is electrically conductive.

3. The portable electrochemical power supply of claim 1 wherein said first section is optically transparent.

4. The portable electrochemical power supply of claim 1 wherein said second section comprises a first subsection and a second subsection, said first subsection comprising a leading end and a trailing end, said second subsection secured to said first subsection's trailing end.

5. The portable electrochemical power supply of claim 4 wherein said first and second subsections form at least a portion of an electrically conductive path between said cell and said circuit board.

6. The portable electrochemical power supply of claim 4 wherein said circuit board comprises an electrically conductive member, and wherein said electrically conductive member contacts the leading end of said first subsection.

7. The portable electrochemical power supply of claim 4 wherein at least a portion of the exterior surface of said subsections is textured to facilitate manual counter rotation of said first and second subsections thereby enabling said first and second subsections to be readily secured to or separated from one another.

8. The portable electrochemical power supply of claim 4 wherein said second subsection is removably secured to the trailing end of said first subsection.

9. The portable electrochemical power supply of claim 4 wherein said electrochemical cell has a first terminal having a first polarity and a second terminal having a second polarity.

10. The portable electrochemical power supply of claim 9 wherein said second subsection comprises a resilient electrically conductive contact that abuts and establishes electrical contact between the second subsection and the electrochemical cell's second terminal.

11. The portable electrochemical power supply of claim 1 wherein said the first end of said connector is recessed below the first end of said housing.

12. The portable electrochemical power supply of claim 11 wherein the first end of said connector is located at the center of said housing's first end.

13. The portable electrochemical power supply of claim 1 including an electrically nonconductive member, wherein said nonconductive member is disposed within said housing between said cell and said circuit board, and wherein said nonconductive member comprises an opening through which said cell contacts said circuit board.

14. The portable electrochemical power supply of claim 1 wherein said electrochemical cell includes an exterior circumferential surface and wherein the circumferential surface is substantially thermally insulated from said housing's second section.

15. The portable electrochemical power supply of claim 1 wherein said connector extends through the first end of said housing.

16. A portable electrochemical power supply, comprising:
  (a) a housing having an interior surface and an exterior said housing comprises at least two sections joined to one another, and wherein the housing includes a cavity adapted to removably receive an electrochemical cell;
(b) an electrical connector disposed through said housing, said connector having a first end accessible from said exterior surface;
(c) a circuit board disposed within said housing, said circuit board in electrical connection with both the electrochemical cell and the connector, said circuit board receiving an input voltage from said cell less than 1.90V and providing an output voltage through said connector greater than 3.00V; and wherein said housing is cylindrically shaped, said cavity is cylindrically shaped and said electrochemical cell is cylindrically shaped, said cavity has an inside diameter that is at least 5% larger than the outer diameter of said cell thereby creating an air gap between the interior surface of said housing, and wherein at least 95% of the exterior circumferential surface area of said cell does not contact an interior circumferential surface of the cavity.

17. The portable electrochemical power supply of claim 16 comprising means for centering said electrochemical cell within said cavity.

18. The portable electrochemical power supply of claim 17 wherein said cavity and said housing are concentric.

19. A process for providing an electric current to a battery powered device, comprising:
(a) providing a battery powered device having at least one port physically and electrically configured to receive an electric current from an external power supply;
(b) selecting an electrochemical cell having a first terminal, a second terminal and an initial unaltered open circuit voltage less than 1.90 V;
(c) providing a housing for at least one circuit board and said electrochemical cell, said housing comprising an open end, a sidewall and a closed end, said circuit board capable of transforming an the electrochemical cell's voltage from a first voltage to a second higher voltage, said housing comprising an electrically nonconductive first section defining the closed end of the housing and through which said electrical connector is disposed and an electrically conductive second section comprising said sidewall;
(d) disposing said cell inside said housing;
(e) securing a cover over the open end of the housing;
(f) providing an elongated electrically conductive connector;
(g) securing said elongated connector to said housing and to said device's port thereby establishing an electrical connection between said housing and said device; and
(h) allowing the assembled housing, elongated connector and device to remain connected while said circuit board receives an input voltage from said cell and provides an output voltage to said device, wherein said input voltage is less than 1.90V and said output voltage is greater than 3.00V.

20. The process of claim 19 wherein said housing comprises an electrically nonconductive first section defining the closed end of the housing and an electrically conductive second section comprising said sidewall.

21. The process of claim 20 wherein said cover and said housing each comprise threaded surfaces and said step of securing a cover over the open end of said housing comprises rotating said cover and said housing in opposite directions to mutually engage the threaded surface on said cover with the threaded surface on said housing.

22. The process of claim 20 wherein said electrochemical cell comprises a single anode and a single cathode.

23. The process of claim 20 wherein said cell comprises an alkaline electrolyte, zinc and at least one of the electrochemically active materials selected from the group consisting of manganese dioxide, nickel oxyhydroxide and silver oxide.

24. The process of claim 19 wherein said cell comprises lithium.

25. The process of claim 19 wherein said cell comprises iron disulfide.

26. A portable battery powered power supply comprising:
(a) a first housing portion having a first end which includes a first comprising and a second end;
(b) second housing portion having third and fourth ends and a battery receiving region disposed therebetween;
(c) a circuit board;
(d) a power supply circuit carried by the circuit board and including an input which receives electrical energy from a first battery and an output which provides electrical energy to a battery powered device;
a first battery contact carried by the circuit board and in electrical communication with the input of the power supply circuit, wherein the first battery contact is adapted to make electrical contact with a terminal located at a first end of a battery received in the battery receiving region;
(f) an electrical connector carried by the circuit board and in electrical communication with the power supply output, wherein the electrical connector is accessible to an exterior of the power supply through the first opening;
(g) a second battery contact adapted to make electrical contact with a terminal located at a second end of the battery;

wherein the second housing portion forms at least a portion of an electrically conductive path between the second battery contact and the input of the power supply circuit; and
wherein the second housing portion is fabricated from an electrically conductive material.

27. The power supply of claim 26 wherein the first housing portion is fabricated from an electrically insulative material.

28. The power supply of claim 26 wherein the power supply includes an electrically insulating member, the third end includes a recess, the electrically insulating member is disposed in the recess, the circuit board is in electrical contact with the third end, and the insulating member allows the positive terminal of a battery received in the battery receiving region to contact the first battery contact but prevents the negative terminal of the battery from contacting the first battery contact.

29. The power supply of claim 26 wherein the circuit board includes an electrically conductive member in electrical communication with the input of the power supply circuit, the second housing portion includes an electrical conductor, the electrically conductive member is in electrical contact with the electrical conductor, and the electrical conductor is in electrical communication with the second battery contact.

30. The power supply of claim 29 wherein the second housing portion is fabricated from an electrically conductive material.

31. A portable battery powered power supply comprising:
(a) a first housing portion having a first end which includes a first opening and a second end;
(b) a second housing portion having third and fourth ends and a battery receiving region disposed therebetween;
(c) a circuit board;
(d) a power supply circuit carried by the circuit board and including an input which receives electrical energy from a first battery and an output which provides electrical energy to a battery powered device;

(e) a first battery contact carried by the circuit board and in electrical communication with the input of the power supply circuit, wherein the first battery contact is adapted to make electrical contact with a terminal located at a first end of a battery received in the battery receiving region;

(f) an electrical connector carried by the circuit board and in electrical communication with the power supply output, wherein the electrical connector is accessible to an exterior of the power supply through the first opening;

(g) a second battery contact adapted to make electrical contact with a terminal located at a second end of the battery; and a cover threadedly joined to the fourth end.

32. The power supply of claim 31 wherein the first and second housing portions are threadedly joined.

33. A portable battery powered power supply comprising:
(a) a first housing portion having a first end which includes a first opening and a second end;
(b) a second housing portion having third and fourth ends and a battery receiving region disposed therebetween;
(c) a circuit board;
(d) a power supply circuit carried by the circuit board and including an input which receives electrical energy from a first battery and an output which provides electrical energy to a battery powered device;
(e) a first battery contact carried by the circuit board and in electrical communication with the input of the power supply circuit, wherein the first battery contact is adapted to make electrical contact with a terminal located at a first end of a battery received in the battery receiving region;
(f) an electrical connector carried by the circuit board and in electrical communication with the power supply output, wherein the electrical connector is accessible to an exterior of the power supply through the first opening;
(g) a second battery contact adapted to make electrical contact with a terminal located at a second end of the battery; and
wherein the second housing portion includes a first cover portion and a second cover portion snappingly connected to the first cover portion, and wherein the first housing portion is snappingly connected to the second housing portion.

34. A portable battery powered power supply comprising:
(a) a first housing portion having a first end which includes a first opening and a second end;
(b) a second housing portion having third and fourth ends and a battery receiving region disposed therebetween;
(c) a circuit board;
(d) a power supply circuit carried by the circuit board and including an input which receives electrical energy from a first battery and an output which provides electrical energy to a battery powered device;
(e) a first battery contact carried by the circuit board and in electrical communication with the input of the power supply circuit, wherein the first battery contact is adapted to make electrical contact with a terminal located at a first end of a battery received in the battery receiving region;
(f) an electrical connector carried by the circuit board and in electrical communication with the power supply output, wherein the electrical connector is accessible to an exterior of the power supply through the first opening;
(g) a second battery contact adapted to make electrical contact with a terminal located at a second end of the battery; and a light pipe disposed in the first housing portion, and wherein the circuit board carries a first light emitting diode, a first light receiving portion of the light pipe is in optical communication with the light emitting diode, and light emitted by the light pipe is visible through the first housing portion.

35. The power supply of claim 34 wherein light emitted by the light pipe is visible through first and second sides of the first housing portion.

36. The power supply of claim 35 wherein light emitted by the light pipe is visible through a third side of the first housing portion.

37. The power supply of claim 35 wherein the circuit board carries a second light emitting diode and wherein a second light receiving portion of the light: pipe is in optical communication with the second light emitting diode.

38. A portable battery powered power supply comprising
(a) a first housing portion having a first end which includes a first opening and a second end;
(b) a second housing portion having third and fourth ends and a battery receiving region disposed therebetween;
(c) a circuit board;
(d) a power supply circuit carried by the circuit board and including an input which receives electrical energy from a first battery and an output which provides electrical energy to a battery powered device;
(e) a first battery contact carried by the circuit board and in electrical communication with the input of the power supply circuit, wherein the first battery contact is adapted to make electrical contact with a terminal located at a first end of a battery received in the battery receiving region;
(f) an electrical connector carried by the circuit board and in electrical communication with the power supply output, wherein the electrical connector is accessible to an exterior of the power supply through the first opening;
(g) a second battery contact adapted to make electrical contact with a terminal located at a second end of the battery; and a third battery contact carried by the circuit board and in electrical communication with the input of the power supply circuit, and wherein the battery receiving region is adapted to receive a second battery.

39. The power supply of claim 38 including a cover latchedly attached to the fourth end, and wherein the second battery contact is carried by the cover.

40. The power supply of claim 39 including a mechanically resilient, electrically conductive member and a user operable latch member operable through the cover, wherein the conductive member and the latch member are carried by the cover, the electrically conductive member is adapted to make electrical contact with terminals of the first and second batteries, and the electrically conductive member urges the latch member toward an exterior of the cover.

41. The power supply of claim 38 including a cover and an electrically conductive member carried by the cover, wherein the conductive member is adapted to make electrical contact with terminals of the first and second batteries, and wherein the cover may be latchedly joined to the fourth end in first and second 1800 rotationally opposed positions.

42. The power supply of claim 26 including a cover and first and second user operable latch members, wherein the first latch member is operable through a first material free region disposed on a first side of the cover and the second latch member is operable through a second material free region disposed on a second side of the cover which is opposite the first side, whereby a user may selectively attach the cover to and remove the cover from the fourth end.

43. The power supply of claim 26 wherein a first angular portion of the first opening has a first diameter and second angular portion of the first opening has a second diameter, whereby the opening is adapted to selectively receive a corresponding external electrical connector for rotational locking engagement therewith.

44. A portable battery powered power supply, wherein the power supply is adapted to selectively receive first and second generally cylindrical batteries and supply electrical energy to an external portable battery powered device through an electrical connector, the power supply consisting essentially of:
  (a) first, second, and third cover portions which lockingly engage so as to form a unitary assembly having a battery receiving region;
  (b) a circuit board, wherein the circuit board carries power supply circuitry, the electrical connector, a first battery contact adapted to make electrical contact with a terminal located at a first end of the first battery, and a second battery contact adapted to make electrical contact with a terminal located at a first end of the second battery,
  (c) a fourth cover portion;
  (d) first and second user operable attachment members carried by the fourth cover portion and adapted to removably attach the fourth cover portion to the unitary assembly;
  (e) a mechanically resilient, electrically conductive member carried by the fourth cover portion, wherein the mechanically resilient, conductive member is adapted to provide an electrical connection between terminals located at a second end of the respective first and second batteries, and wherein the mechanically resilient conductive member is in operative mechanical communication with the latch members.

45. The power supply of claim 44 including a light source carried by the circuit board.

46. The power supply of claim 45 including a light pipe in operative communication with the light source.

47. A portable battery powered power supply comprising:
  (a) a first polymeric cover portion;
  (b) a second polymeric cover portion which lockingly engages the second cover portion so as to form a unitary assembly which includes a cavity adapted to receive a battery;
  (c) a circuit board;
  (d) power supply circuitry carried by the circuit board and having an input which receives electrical energy from a battery and an output for providing electrical energy to an external device;
  (e) a first electrical connector carried by the circuit board and in electrical communication with the output of the power supply circuitry, wherein the first electrical connector is adapted to provide a removable electrical connection to a corresponding external connector;
  (f) a first battery contact carried by the circuit board and in electrical communication with the input of the power supply circuitry, wherein the first battery contact is adapted to provide an electrical contact with a terminal located at a first end a battery received in the cavity;
  (g) a third polymeric cover portion which latchingly engages the unitary assembly so as to allow a user to selectively access the cavity;
  (h) a second battery contact carried by the third cover portion, wherein the second battery contact is adapted to provide an electrical contact with a terminal located at a second end of the battery.

48. A method of assembling a battery powered power supply, the method including:
  (a) installing first and second human operable attaching members and a mechanically resilient, electrically conductive member in a first cover portion so that the conductive member urges the attaching members toward an interior surface of the first cover and provides a first battery contact;
  (b) snappingly attaching a second cover portion to a third cover portion to form a housing having first and second ends and a battery receiving region disposed therebetween;
  (c) inserting a circuit board which carries an electrical connector, a second battery contact, and electrical circuitry which receives electrical energy from a battery and generates a power supply output for providing electrical energy to an external device in a fourth cover portion so that the electrical connector aligns with a first opening in the fourth cover portion;
  (d) snappingly attaching the fourth cover portion to the first end of the housing;
  (e) using the attaching members to removably attach the first cover portion to the second end of the housing.

49. The method of claim 48 including inserting a light pipe in the fourth cover portion.

* * * * *